(12) United States Patent
Pfitzner

(10) Patent No.: US 10,687,458 B2
(45) Date of Patent: Jun. 23, 2020

(54) SEEDING BOOT FOR A SEEDING APPARATUS

(71) Applicant: Jason James Michael Pfitzner, Eudunda (AU)

(72) Inventor: Jason James Michael Pfitzner, Eudunda (AU)

( * ) Notice: Subject to any disclaimer, the term of this patent is extended or adjusted under 35 U.S.C. 154(b) by 0 days.

(21) Appl. No.: 16/283,176

(22) Filed: Feb. 22, 2019

(65) Prior Publication Data

US 2019/0239420 A1 Aug. 8, 2019

Related U.S. Application Data

(62) Division of application No. 14/762,698, filed as application No. PCT/AU2014/000052 on Jan. 29, 2014, now Pat. No. 10,398,075.

(30) Foreign Application Priority Data

Jan. 29, 2013 (AU) ................................ 2013900301
Jan. 29, 2013 (AU) ................................ 2013900302

(51) Int. Cl.
| | | |
|---|---|---|
| A01C 7/06 | (2006.01) | |
| A01C 5/06 | (2006.01) | |
| A01B 49/06 | (2006.01) | |
| A01B 15/16 | (2006.01) | |
| A01B 15/02 | (2006.01) | |
| A01C 5/08 | (2006.01) | |

(52) U.S. Cl.
CPC ................ *A01C 7/06* (2013.01); *A01B 15/02* (2013.01); *A01B 15/16* (2013.01); *A01B 49/06* (2013.01); *A01C 5/062* (2013.01); *A01C 5/064* (2013.01); *A01C 5/08* (2013.01)

(58) Field of Classification Search
CPC .......... A01C 5/062; A01C 7/06; A01C 5/064; A01B 49/06
See application file for complete search history.

(56) References Cited

U.S. PATENT DOCUMENTS

| | | | | |
|---|---|---|---|---|
| 1,838,476 A | * | 12/1931 | Cowell ................... | A01C 5/064 111/168 |
| 2,869,489 A | * | 1/1959 | Buhr ....................... | A01C 5/064 111/150 |
| 3,213,812 A | * | 10/1965 | Forsyth .................. | A01C 5/064 111/157 |

(Continued)

*Primary Examiner* — Alicia Torres
(74) *Attorney, Agent, or Firm* — Duane Morris LLP

(57) ABSTRACT

A seeding boot for a seeding apparatus mountable adjacent a soil-opening disc of a tillage implement. The seeding boot including: a boot body mountable at, or adjacent, a lower portion of the soil-opening disc; a seed distributor on the boot body, the seed distributor having at least one seed outlet spaced laterally from the soil-opening disc; a seed inlet, connectable to a source of seeds to be planted, for the seed distributor; and at least one fertiliser distributor, the at least one fertiliser distributor having at least one fertiliser outlet located rearwardly of the soil-opening disc, and downstream of the at least one seed outlet. The seed distributor has a substantially hollow distributor body connected to the seed inlet, and a pair of substantially hollow wings extend substantially laterally from the distributor body and are each provided with a respective one of the at least one seed outlets.

11 Claims, 25 Drawing Sheets

(56) References Cited

U.S. PATENT DOCUMENTS

| | | | | |
|---|---|---|---|---|
| 4,998,488 A | * | 3/1991 | Hansson | A01C 5/064 111/121 |
| 2008/0229986 A1 | * | 9/2008 | Arksey | A01C 5/064 111/12 |
| 2009/0308296 A1 | * | 12/2009 | Senchuk | A01C 5/062 111/8 |
| 2012/0266794 A1 | * | 10/2012 | Schaffert | A01C 5/062 111/52 |
| 2015/0107501 A1 | * | 4/2015 | Barton | A01C 5/064 111/152 |

* cited by examiner

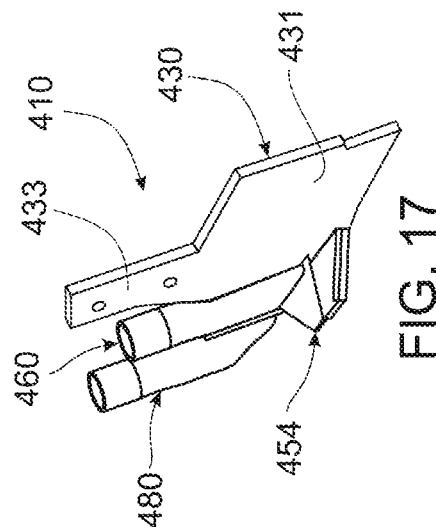
FIG. 17
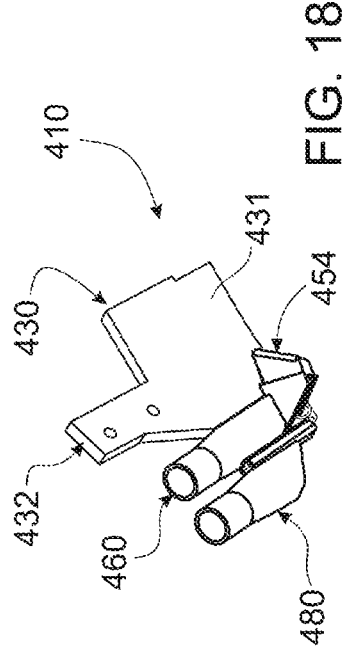
FIG. 18
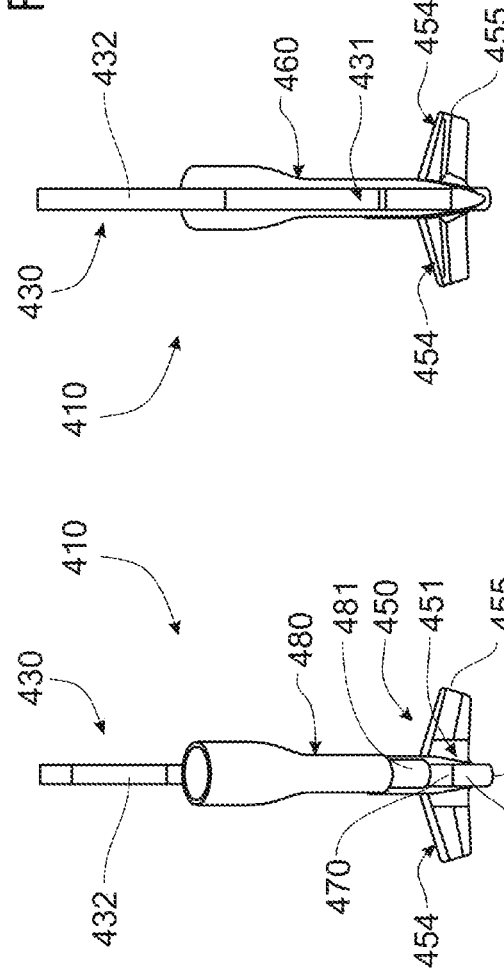
FIG. 19
FIG. 20

SEEDING BOOT FOR A SEEDING APPARATUS

CROSS-REFERENCE TO RELATED PATENT APPLICATIONS

The present application is a divisional of U.S. patent application Ser. No. 14/762,698, filed Jul. 22, 2015, which claims priority to U.S. national stage application under 35 U.S.C. § 371 of PCT Application No. PCT/AU2014/000052, filed Jan. 29, 2014, which claims priority to Australian patent application no. 2013900301, filed Jan. 29, 2013, and Australian patent application no. 2013900302, filed Jan. 29, 2013, the entireties of which are incorporated herein by reference.

BACKGROUND OF THE INVENTION

1. Field of the Invention

This invention relates to seeding apparatus.

The invention particularly relates, but is not limited to, seeding apparatus to plant grains or seeds in row(s) spaced from fertiliser(s) and/or other chemicals (e.g. herbicides or fungicides).

Throughout the specification, the term "seeds" shall included grains and seeds, where the grains or seeds may be planted to grow crops including (but not limited to) wheat, barley, oats, rice, rye, triticale, sunflowers, safflowers, or the like; and shall also peas, chickpeas, beans, legumes, flowers seeds, or the like; and the term "tillage implement" shall include a cultivator, disc plough or like machine.

2. Prior Art

NB: The following discussion is by way of background information only, and is not to be considered a statement of the common general knowledge (CGK) in the area of technology anywhere in the world.

The relationship between seed and fertiliser placement is crucial to plant growth and health.

Fertiliser should never be placed directly below the seed.

When soil moisture is limited, roots will always grow down to seek moisture and can enter a band of concentrated fertiliser, that is toxic to the plants when moisture stressed.

Fertiliser should never be deep banded (i.e. 30 mm or more below the seeds). Winter crops will suffer in early growth stages if the soil remains cold and wet, and the plants can't access the fertiliser that has been deep banded. In these conditions, fertiliser is very prone to leeching, making it inaccessible to the plants at later growth stages.

As the feeder roots on plants grow laterally, it is ideal to position fertiliser in a band adjacent to the planted seeds. In dry conditions, with this positioning, the roots can access deep subsoil moisture without being detrimental to plant growth and health.

Achieving successful paired seed rows delivers optimum competition against weeds, and promotes early crop canopy closure for moisture retention.

Examples of prior art solutions include:

The Stiletto™ boot bolts behind any tyned tillage implement and uses a knife point to open the soil. The fertiliser tube is positioned in front of the paired row seed tubes. With this configuration, the fertiliser is deep banded; and the fertiliser tube blocks with mud in certain conditions. The paired row seed tubes have small outlets, restricting the flow of larger seeds e.g. peas, chickpeas, beans etc. The outlets of the paired row seed tubes face downwardly, and can block with mud in certain conditions. The boot is big and bulky, creating excessive soil throw, thereby resulting in chemical damage to the seedlings; and leaves deep furrows in the planted soil, making it rough to drive on.

The Atom Jet™ boot bolts in front of any tyned tillage implement. It does not use a knife point to open the soil; and so the boot is exposed to premature wear. Seed bed preparation is also compromised as knife points play a pivotal role in achieving this. The Atom Jet™ boot is designed to place seed and fertiliser on the same plane. This restricts the amount of fertiliser that can be applied, as high rates of fertiliser in the seed zone can result in fertiliser toxicity of the seedling. This system does not create a loosened section of soil below the seedbed for strong establishment of roots, resulting in what is called a "hard pan". Hoses and seed and fertiliser tubes may also exposed to premature wear from rocks and soil because of their orientation in front of the tynes.

The John Deere® 1890™ is a very complex disc seeding implement that has a soil-opening disc that is set at 7° to the direction of travel; a gauge wheel; a seed firmer wheel; a furrow closer wheel; and a single shoot seed/fertiliser tube. In heavy stubble loads, the implement requires an Aricks wheel to clear the stubble residue. It has many grease nipples; many moving parts; and requires considerable maintenance, e.g. the discs need replacing once they have worn 25 mm off their radius. In addition, the 1890™ implement produces no under-seed tilth for strong root growth; only provides seed and fertiliser to be placed down the same tube; and suffers from seed bounce. Hair pinning is another big problem. (Hair pinning occurs when stubble/residue is stuffed into the seed bed causing poor emergence of the plants; disease in the plants; and chemical toxicity from pre-emergent herbicides.) Chemical incorporation is less than adequate, as soil disturbance is close to nil.

The Cross slot/bio Blade™ implement has a scalloped soil-opening disc that runs true (i.e. at 0°) to its direction of travel; and two soil opener plates, with delivery tubes one on each side of the soil-opening disc. These plates are individually adjustable, and deliver seed or fertiliser in each tube. The implement has two press wheels (i.e. one on each side of the disc) that govern the depth of the entire assembly. The soil-opening disc and opener plates require frequent replacement; and the entire implement requires constant maintenance. Seeding in wet conditions is impossible, as the implement generates a big mud ball; the soil-opening disc stalls; and the seed and fertiliser tubes become blocked.

There are many other types of disc seeder implements including triple discs; double discs; and single disc. All types of disc seeder implements currently available are very expensive; produce crops with poor early plant vigour; require expensive/frequent ongoing maintenance; and are limited to when they can be used in certain conditions.

A summary of the problems of existing products includes (but is not limited to):
a) Excessive soil throw by the boot;
b) Poor root growth;
c) Seed tube blockages;
d) Fertiliser tube blockages;
e) Excessive mud build-up on the boots;
f) Wear protection failure;
g) Seed bounce, resulting in poor (or nil) seed encapsulation in the soil
h) Hair pinning (as discussed above);
i) Poor early vigour of crop;
j) Poor chemical incorporation;

k) Disc stalling (i.e. stops rotating and wears unevenly); and l) Expensive to purchase (i.e. high capital costs) and to maintain (with resultant loss in productivity).

OBJECTS OF THE INVENTION

It is an object of the present invention to overcome, or at least ameliorate, the problems of the Prior Art.

Other preferred objects of the present invention will become apparent from the following description.

SUMMARY OF THE PRESENT INVENTION

In a first aspect, the present invention resides in seeding boot for a seeding apparatus mountable on a tyne of a tillage implement, the seeding boot including:

a boot body mountable at, or adjacent, a lower end of the tyne;

a seed distributor on the boot body, the seed distributor having at least one seed outlets spaced laterally from the tyne;

a seed inlet, connectable to a source of seeds to be planted, for the seed distributor; and at least one fertiliser (and/or other chemical) distributor, the, or each, fertiliser distributor having a fertiliser outlet located rearwardly of the tyne, and downstream of the seed outlet(s).

Preferably, the boot body is releasably mounted to the lower end of the tyne, e.g. by bolts or other fasteners; and the boot body may incorporate a knife point extending forwardly of the tyne, or be substantially aligned with a knife point releasably mounted on the front of the tyne.

In a second aspect, the present invention resides in a seeding boot for a seeding apparatus mountable adjacent a soil-opening disc of a tillage implement, the seeding boot including:

a boot body mountable at, or adjacent, a lower portion of the soil-opening disc;

a seed distributor on the boot body, the seed distributor having at least one seed outlet spaced laterally from the soil-opening disc;

a seed inlet, connectable to a source of seeds to be planted, for the seed distributor; and at least one fertiliser (and/or other chemical) distributor, the, or each, fertiliser distributor having a fertiliser outlet located rearwardly of the soil-opening disc, and downstream of the seed outlet(s).

Preferably, the boot body is releasably mounted, e.g. by bolts or other fasteners to a press wheel arm of the tillage implement; and the boot body may incorporate a plate/scraper engageable with a shadow- (or rearward-) face of the soil-opening disc.

Preferably, for both types of seeding apparatus, the seed distributor has a substantially hollow body connected to the seed inlet;

and a pair of substantially hollow wings extend substantially laterally from the distributor body and are each provided with a respective one of the seed outlets.

Preferably, each substantially hollow wing is rearwardly inclined, in top plan view, so that the seed outlets are rearward of the distributor body.

Preferably, the seed inlet is operably connected to the source of seeds by a seed tube mounted rearwardly of the tyne or the soil-opening disc.

Preferably, a first one of the fertiliser outlets is connected to a source of "dry" or "granular" fertiliser by a dry fertiliser tube; and/or a second one of the fertiliser outlets is connected to a source of liquid fertiliser (and/or other chemicals).

Preferably, the first and/or second fertiliser outlets are aligned rearwardly of the tyne or the soil-opening disc; with the second fertiliser outlet intermediate the tyne or soil-opening disc and the first fertiliser outlets; and the first and/or second fertiliser outlets are at a reduced depth in the soil relative to the seed outlets.

Preferably, at least leading portions of the boot, included any integral knife point, with be provided with one or more wear-resistant coatings, panels, tiles or the like.

In a third aspect, the present invention resides in a tyne for a tillage implement provided with a seeding boot as described as described in the first aspect.

In a fourth aspect, the present invention resides in a tillage implement provided with at least one tyne provided with a seeding boot as described in the first aspect.

In a fifth aspect, the present invention resides in a method of seeding seeds and fertiliser employing a tillage implement having at least one tyne provided with a seeding boot as described in the first aspect.

In a sixth aspect, the present invention resides in a disc seeder assembly for a tillage implement provided with a seeding boot as described in the second aspect.

In a seventh aspect, the present invention resides in a tillage implement provided with at least one disc seeder assembly provided with a seeding boot as described in the second aspect.

In an eighth aspect, the present invention resides in a method of seeding seeds and fertiliser employing a tillage implement having at least one disc seeder assembly provided with a seeding boot as described in the second aspect.

In a ninth aspect, the present invention resides in a digging assembly mountable at a lower end of a tyne of a tillage implement, the assembly including:

a knife point holder having a holder body with an elongate socket defined by a base wall interconnecting a pair of side walls, the base wall being securable to the tyne;

a first abutment face at a forward end of the base wall adjacent the socket;

a second abutment face on a top wall interconnecting the side walls intermediate their length; and the knife point having an elongate body with a rear portion thereof dimensioned to be received within the elongate socket of the holder;

a soil-cutting profile on a front portion of the elongate body;

a first rearwardly-directed abutment face on the front portion of the body engageable with the first abutment face on the holder;

a second rearwardly-directed abutment face on the rear portion of the body engageable with the second abutment face; and at least one hole through the rear portion of the body align-able with a respective pair of holes in the side walls of the holder to receive a fastener to releasably secure the knife point in the holder.

Preferably, at least two holes are provided in the base wall of the holder to receive respective fasteners to releasably mount the holder on the tyne;

the second abutment face on the top wall of the holder is concave in top plan view to permit one of the fasteners to be inserted into a forward-most of the holes in the base wall; and the second abutment face on the knife point is convex in top plan view complementary thereto.

Preferably, the first abutment face on the knife point is provided within a rearwardly-directed recess in the front portion of the body, the recess receiving a lug on the forward end of the holder body, the lug being formed integrally with the base wall and having the first abutment face at a forward end thereof.

Preferably, a lower face on the rear portion of the knife point body engages heads of the fasteners mounting the holder to the tyne.

Preferably, at least one wear resistant strip is applied to the soil-cutting profile at the front end of the front portion of the body of the knife point.

In a tenth aspect, the present invention resides in a tyne for a tillage implement fitted with the digging assembly of the ninth aspect.

Other aspects, or features, of the present invention will become apparent to the skilled addressee from the following description.

BRIEF DESCRIPTION OF THE DRAWINGS

To enable the invention to be fully described, and to enable the skilled addressee to be able to put invention into practical effect, preferred embodiments of the invention will now be described with reference to the accompanying drawings, in which:

FIG. 17 is an isometric front view of a fifth embodiment of a seeding boot, in accordance with the present invention, mountable on a disc seeder assembly of a tillage implement;

FIG. 18 is an isometric rear view of the seeding boot;

FIG. 19 is a front elevational view thereof;

FIG. 20 is a rear elevational view thereof;

DETAILED DESCRIPTION OF THE PREFERRED EMBODIMENTS

Figure 2:
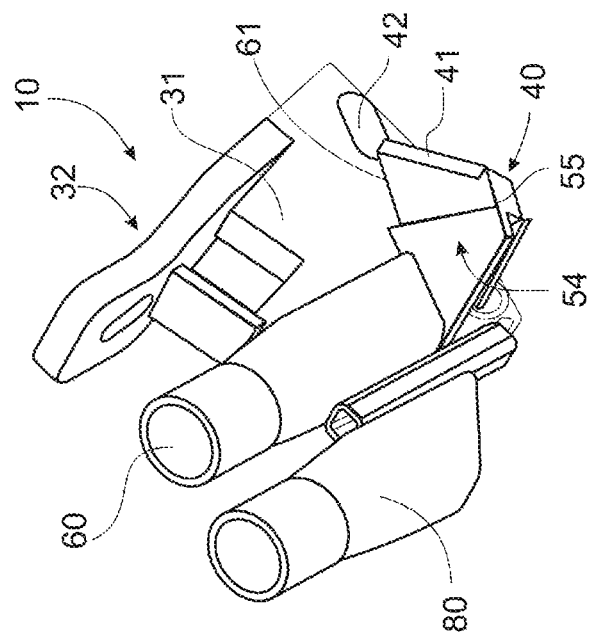
FIG. 2 is an isometric rear view of the seeding boot.
Figure 1:
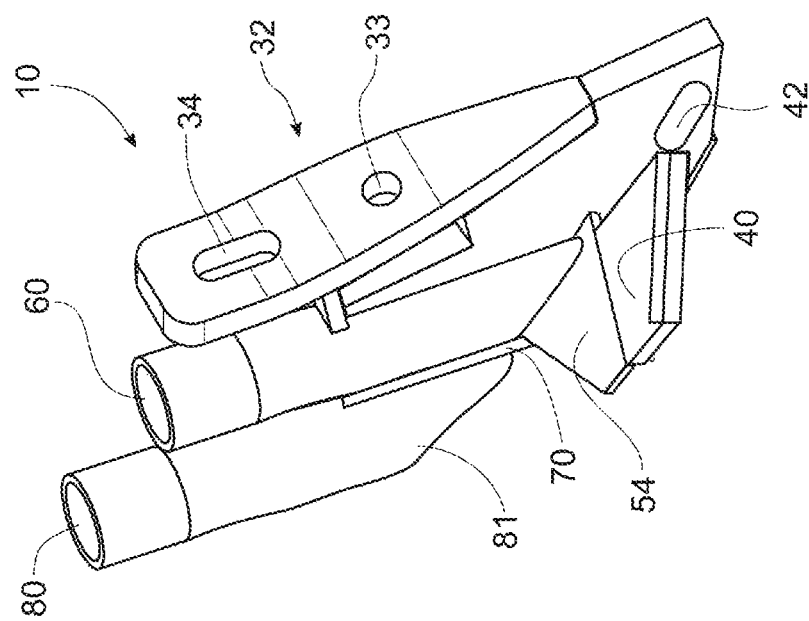
FIG. 1 is an isometric front view of a first embodiment of a seeding boot, in accordance with the present invention, mountable on a tyne of a tillage implement.
Figure 4:
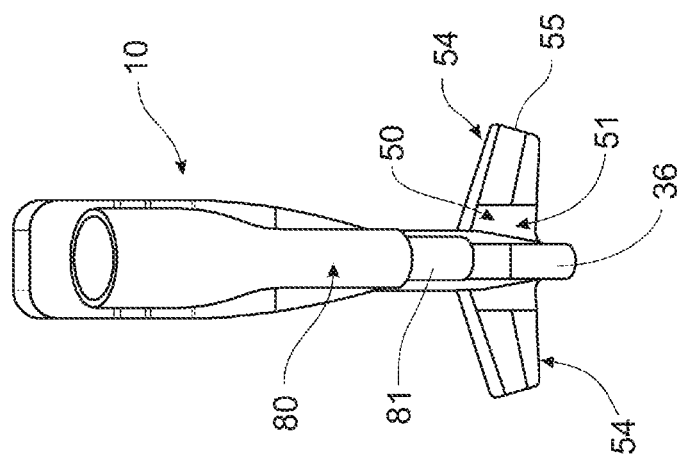
FIG. 4 is a rear elevational view thereof.
Figure 3:
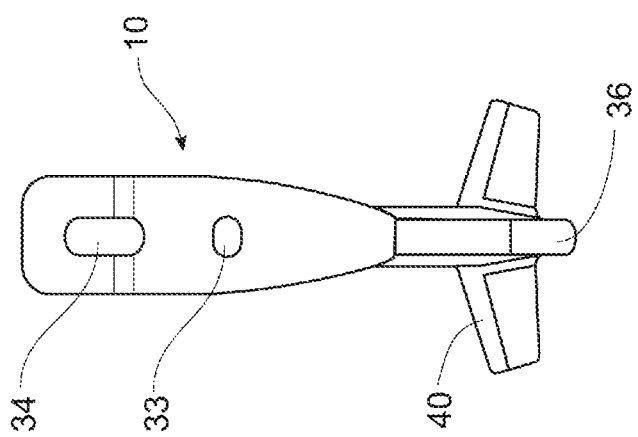
FIG. 3 is a front elevational view thereof.
Figure 5:
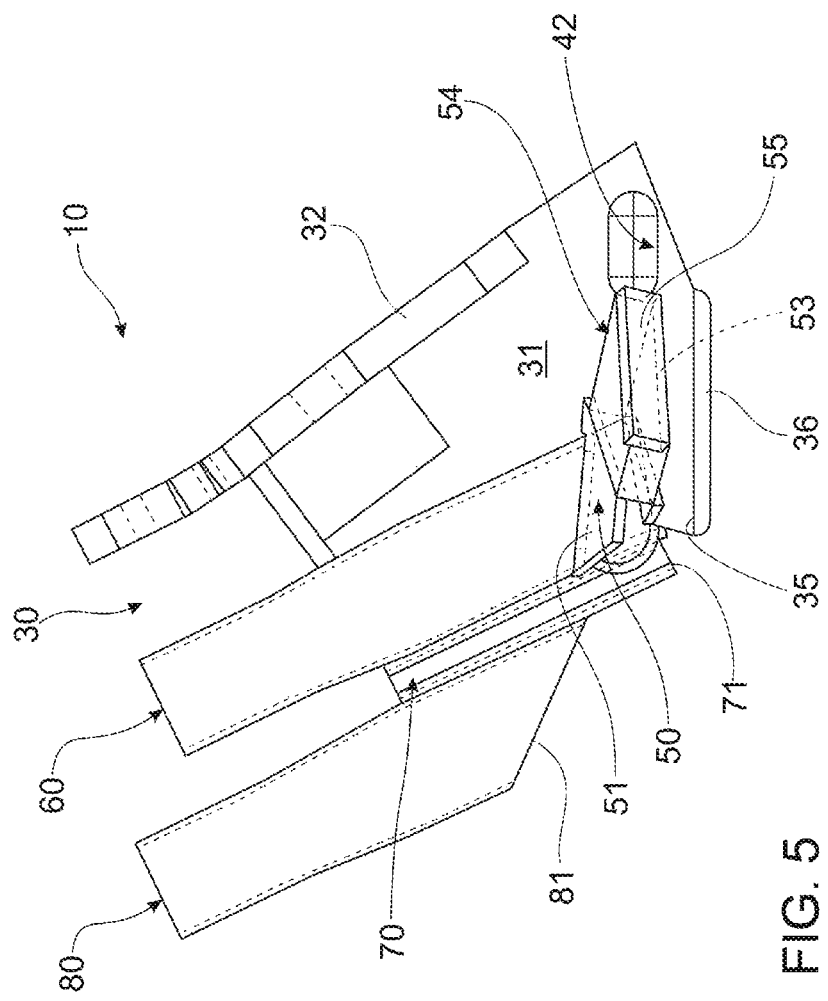
FIG. 5 is a sectional side view thereof, taken on line A-A on FIG. 4.
Figure 6:
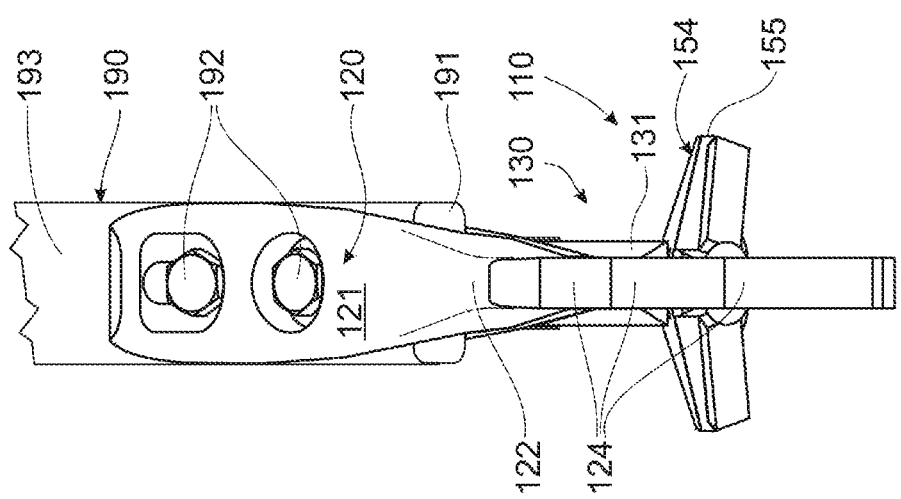
FIG. 6 is a front elevational view of a second embodiment of a seeding boot, in accordance with the present invention, mounted on a tyne of a tillage implement, rearwardly of a knife point.
Figure 7:
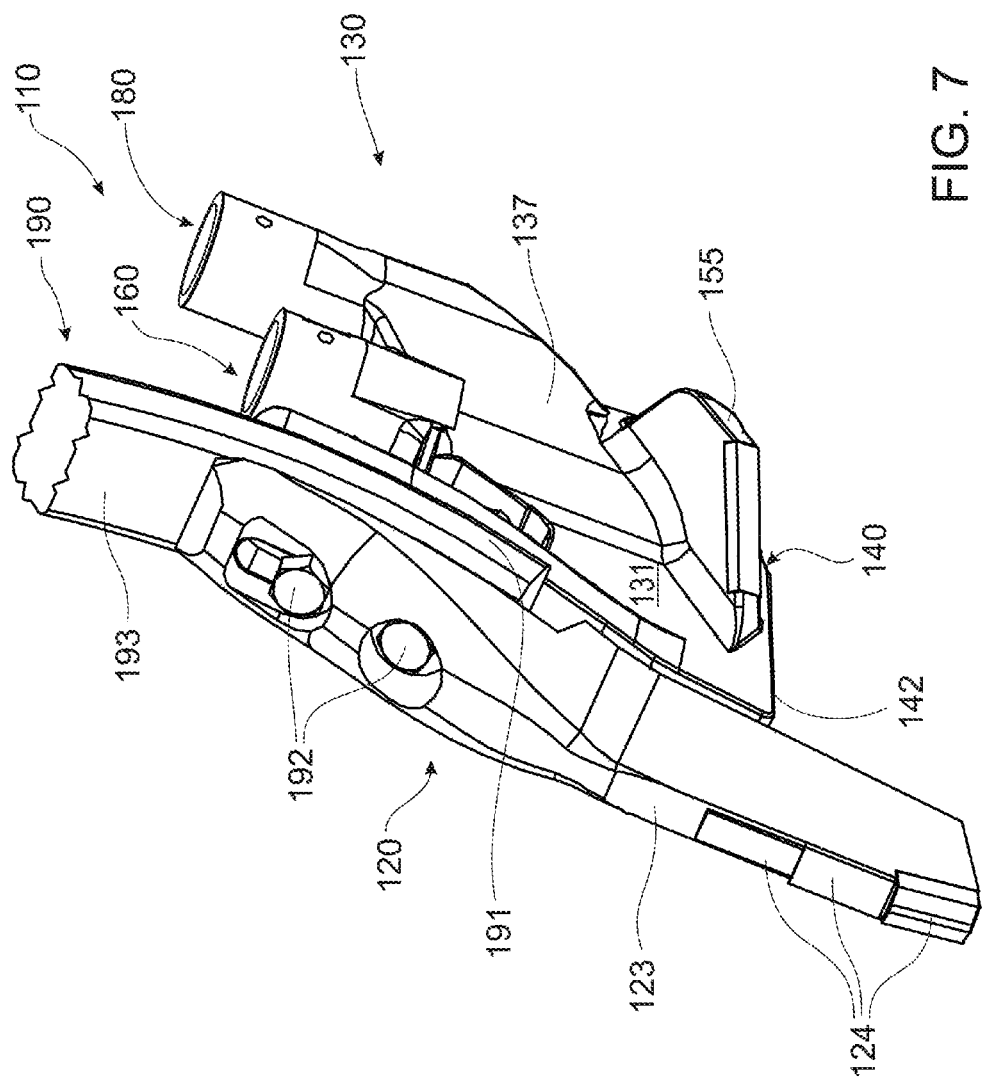
FIG. 7 is a front isometric view thereof.
Figure 8:
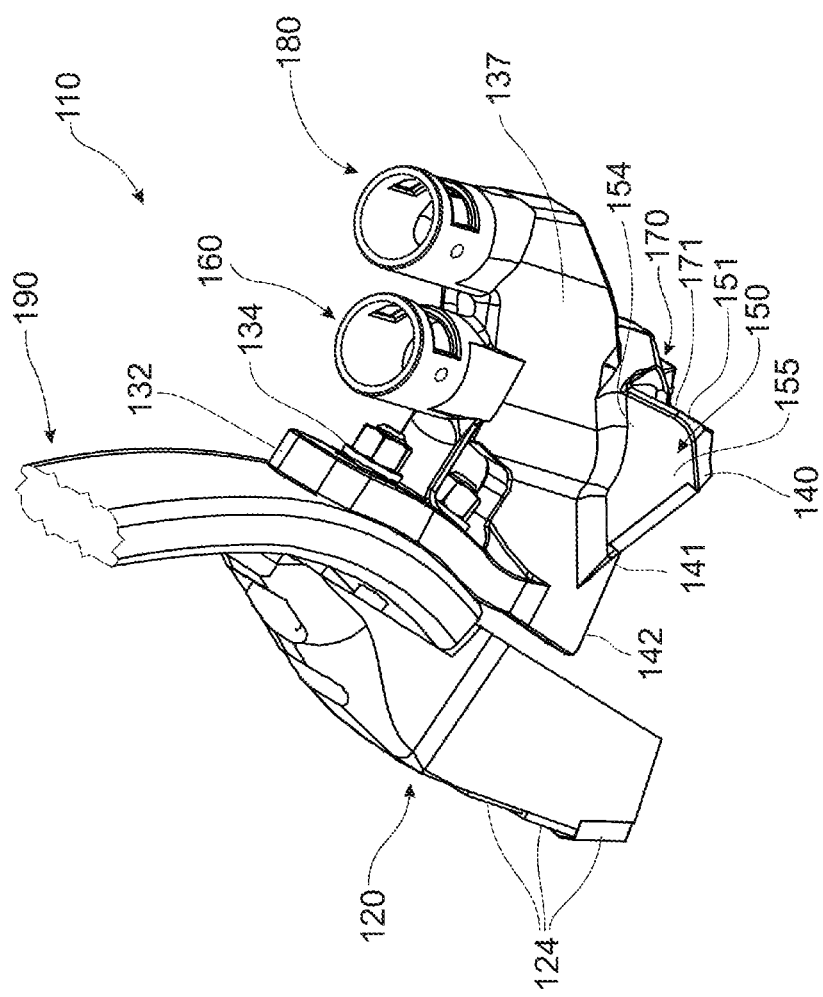
FIG. 8 is a rear isometric view thereof, from above.
Figure 9:
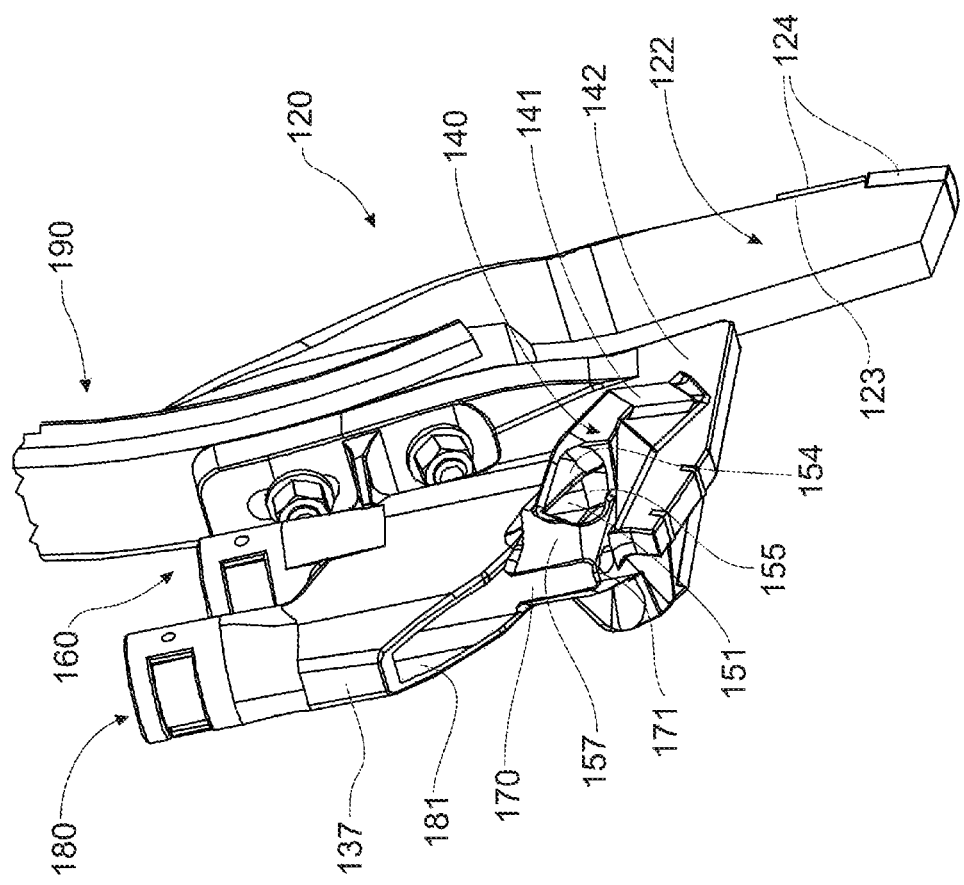
FIG. 9 is a similar view, from below.

The first embodiment of the present invention, to be hereinafter described by way of illustration with references to FIGS. 1 to 5, shall describe seeding apparatus for wheat/barley/oats grain seeds.

The seeding apparatus 10, illustrated in FIGS. 1 to 5, is arranged to be releasably mounted at the lower end of a tyne (not shown) of a tillage implement, typically of the type drawn by a prime-mover (e.g. a tractor) and having associated seed, dry fertiliser and/or liquid fertiliser (and/or chemical) storage compartment(s) and/or or tanks (also not shown). The seed and fertilisers may be conveyed to the respective tynes by pneumatic-means or as pumped liquids.

The seeding apparatus 10 is mounted on the tyne rearwardly of a knife point (not shown), mounted on the front of the tyne; the knife point being arranged to cut a furrow in the soil.

The seeding apparatus 10 has a boot body 30. including a body plate 31 extending rearwardly of, downwardly from, and transverse to, a mounting plate 32, with a hole 33 and slot 34, for releasable mounting of the boot body 30 to rear face at the lower end of the tyne, by suitable fastener(s) (not shown), where the fasteners may also secure the knife point to the tyne. The heel 35 of the body plate 31 has a wear-resistant strip 36. The mounting plate 32 is upwardly divergent in front view (see FIG. 3) to assist in "rolling" to soil to the sides of the furrow cut by the knife point 20.

Horizontal blades 40, with rearwardly-inclined, wear-resistant, leading edges 41, extend laterally from opposed sides of the body plate 31, to cut horizontal paths through the soil for the seed distributor 50, as will be hereinafter described. Wear-resistant sub-wings 42 extending laterally from the body plate 31 forwardly of the horizontal blades 40.

The seed distributor 50 has a hollow body 51 mounted transversely, rearwardly of the body plate 31; and has a seed inlet 52 in a top wall 53, connected to a seed tube 60 (connected to the source of seed).

Hollow wings 54 extend from both sides of the seed distributor body 51, and are rearwardly inclined in top plan view, lying behind respective horizontal blades 40. Each hollow wing 54 has a seed outlet 55 at, or adjacent, its distal end.

A liquid fertiliser tube 70 is mounted on the rear of the seed tube 60, and is connected to a source of liquid fertiliser (and/or chemical(s)); while a dry fertiliser tube 80 is mounted on the rear of the liquid fertiliser tube 70, and is connected to a source of dry, or granular, fertiliser.

The liquid fertiliser tube 70 has an outlet 71 aligned with the knife point, and at approximately the same depth as the seed outlets 55. The dry fertiliser tube 80 also has an outlet 81 aligned with the knife point, but at a shallower depth than the liquid fertiliser outlet 71 to minimise soil "wetted" by the liquid fertiliser (and/or chemical(s)) "clogging" the dry fertiliser outlet 81. (By way of example, the dry fertiliser outlet 81 may be located at a reduced depth of 20-40 mm relative to the seed outlets 55.)

The seed outlets 55 are spaced so as to deposit the seeds in respective bands spaced e.g. 10-150 mm, more preferably 60-80 mm, from the band of fertiliser(s) deposited by the outlets 71, 81.

The operation of the seeding apparatus 10 will now be described:

As the tillage implement advances the tyne, the knife point cuts a vertical furrow in the soil, along which the tyne advances. The horizontal wings 40 cut "slots" in the soil, to either side of the furrow, to form an overall "inverted-T" shape cut through the soil.

The seeds, supplied to the seed distributor body 51, via the seed tube 60, pass along the hollow wings 54 and are distributed in bands (e.g. 20-40 mm wide) from the seed outlets 55, the bands being spaced e.g. 90 mm from the centreline of the tyne.

Liquid fertiliser (and/or other chemical(s)) are dispensed from the liquid fertiliser outlet 71 into a band (e.g. of 20-40 mm width) within the furrow.

Dry (or granular) fertiliser is then dispensed from the dry fertiliser outlet 81 into a band (e.g. of 20-40 mm width) within the furrow, but at a reduced depth (of e.g. 20-40 mm) relative to the band of the liquid fertiliser.

When the tyne (and respective tubes 60, 70, 80) have passed, the soils "falls into" the furrow to close the latter. (As the seeds have been deposited in bands laterally offset from the furrow, they will be fully encapsulated by the soil.)

As the seeds are spaced from the fertiliser(s), they are not liable to fertiliser poisoning; and the feeder roots of the germinated seeds will progressively spread and contact the fertiliser(s) to promote the growth of their respective plants.

The skilled addressee will appreciate that the specific design criteria for a particular boot 30 will depend, inter alia, on: the soil type; tillage point (or blade or share); the seeds being planted; the fertiliser(s) and/or chemicals being distributed; the soil moisture (or likelihood of future precipitation); and/or other factors.

The seeding apparatus 110, of the second embodiment, illustrated in FIGS. 6 to 9, has a generally similar construction to the seeding apparatus 10 of FIGS. 1 to 5; and similar reference numeral, increased by 1xx, will be used for similar features (e.g. seed outlets 155). This embodiment is designed for manufacture of some, or all, of the components by casting.

The seeding apparatus 110 is mounted at the lower end 191 of the tyne 190, via fasteners 192.

A knife point 120 has a body 121 mounted on the front face 193 of the tyne 190 by the fasteners 192; and a lower portion 122 of the knife point body 121 has an inclined leading edge 123 with wear-resistant panels or tiles 124.

The lower ends of the seed tube 160, liquid fertiliser tube 170, and dry fertiliser tube 180, and their respective outlets 161, 171, 181 are cast integrally with side plates 137 which extend rearwardly from the body plate 131. The tubes 160, 170, 180 are connectable to respective hoses or tubes connected to the respective seed, liquid fertiliser and dry fertiliser sources, as hereinbefore described.

The (curved) rear wall 157 of the seed distributor 150 defines the lateral spacing between the seed outlets 155 (which extend along the outer portions of the rear of the wings 154).

The operation of the seeding apparatus 110 will be similar to the operation of the seeding apparatus 10 as hereinbefore described.

Figure 10:
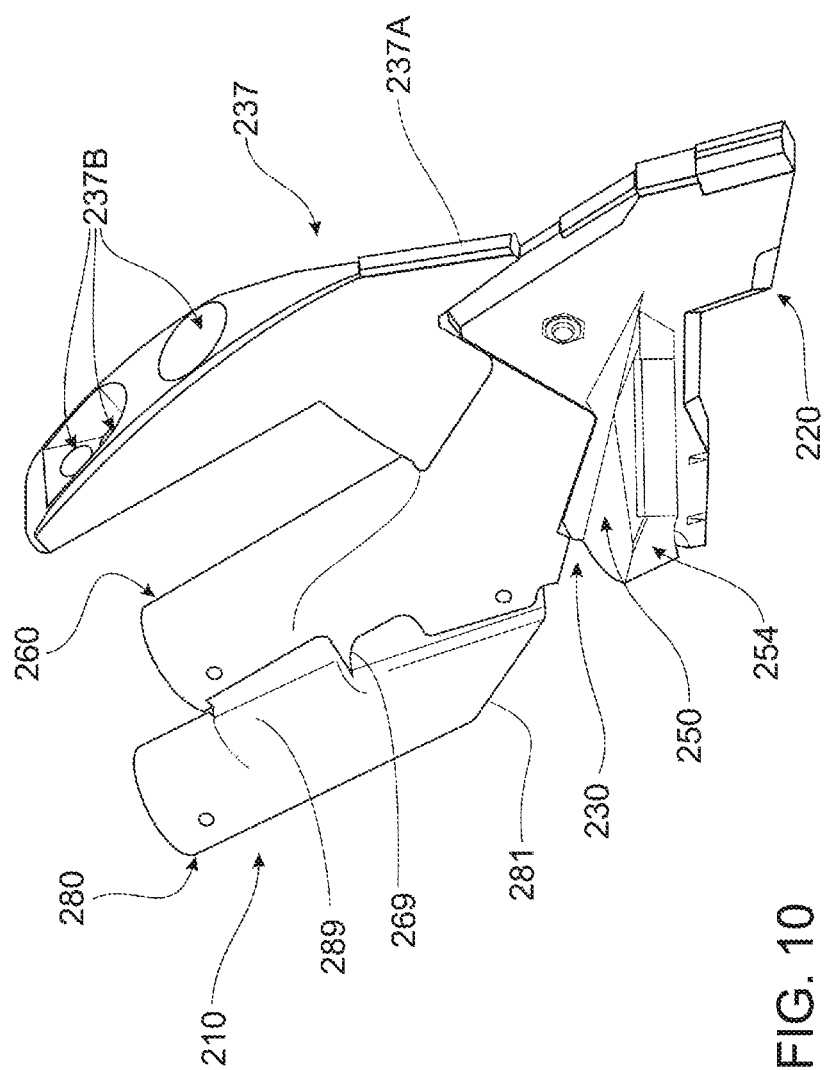
FIG. 10 is an isometric front view of a third embodiment of the seeding boot, in accordance with the present invention, mountable on a tyne of a tillage implement.
Figure 11:
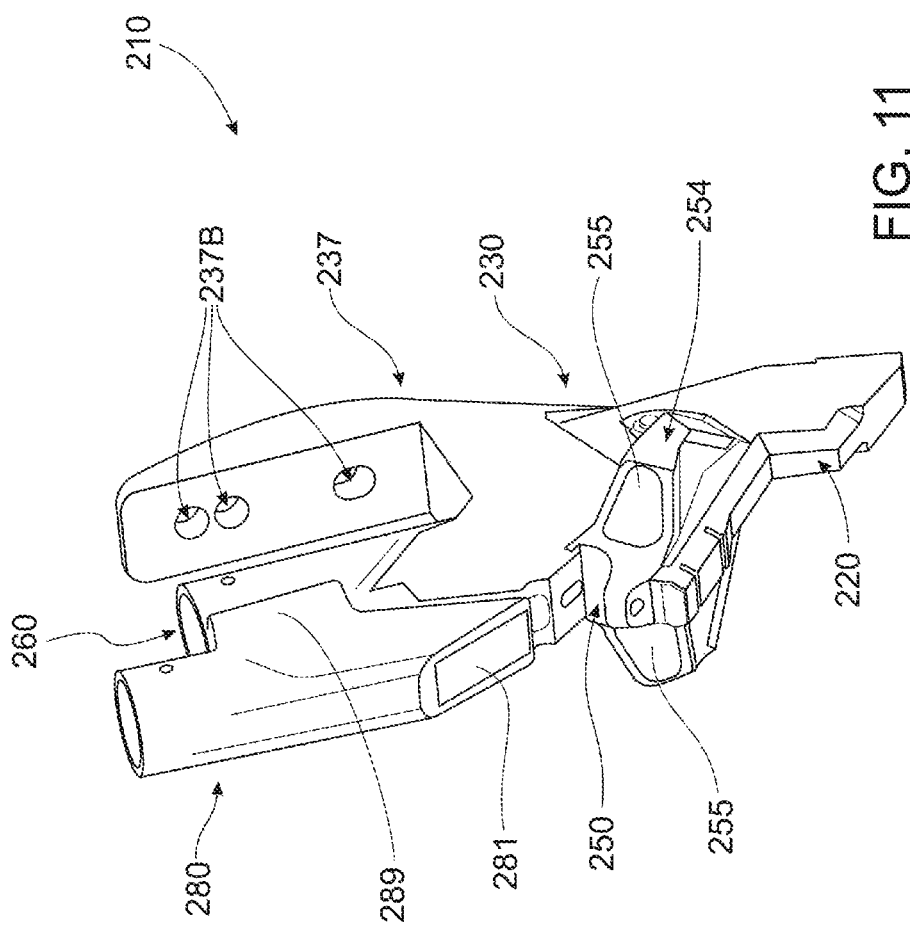
FIG. 11 is a rear isometric view thereof.

The seeding apparatus 210 of the third embodiment, illustrated in FIGS. 10 and 11, is also manufactured by casting; but the removable digging point 220 is mounted on the seeding boot 230, rather than on the lower end of the tyne.

The seeding boot 230 incorporates an integral nose portion 237, divergently-tapered in top plan view, which is aligned with the digging point 220 and which has a wear-resistant strip 237A along at least the lower end of the nose portion 237 The seeding boot 230 is releasably mounted by bolts received in the holes 237B in the nose portion 237.

The seed boot 230 is cast in three sections: the nose portion 237 and seed tube 260; the seed distributor 250, including the wings 254 and seed outlets 255; and the fertiliser tube 280 (including its outlet 281). The fertiliser tube 280 has in-turned flanges 289 engaging respective lugs 269 on the seed tube 260.

Figure 12:
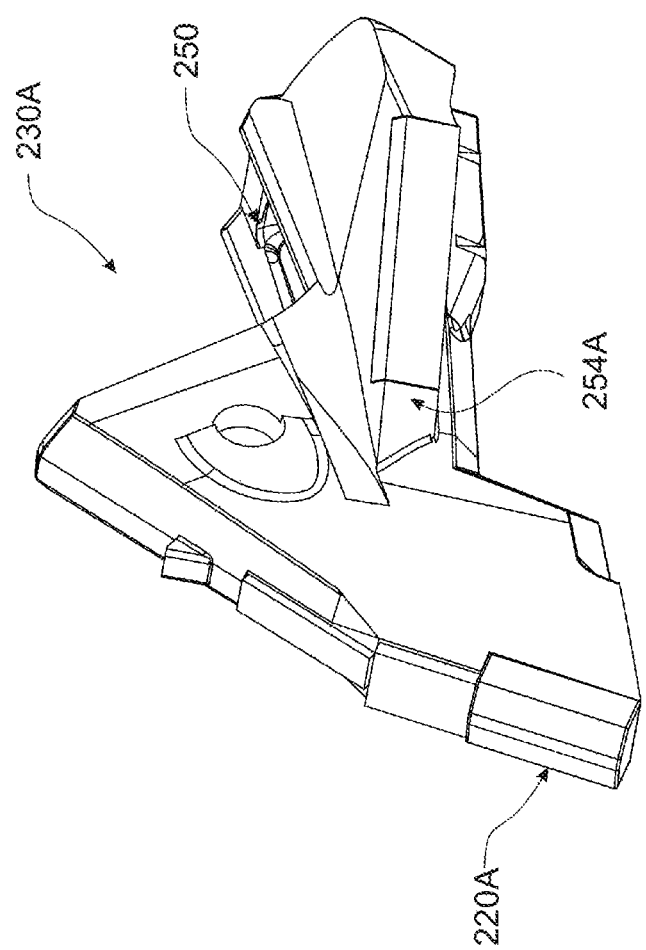
FIG. 12 is an isometric front view of modified version of the third embodiment.

The modified seeding boot 230A illustrated in FIG. 12 more clearly illustrates how the seed distributor 250A is cast integrally as one part of the seed boot 230—in the version, the seed distributor 250A is cast integrally with the knife point 220A and the wings 254A.

Figure 13:
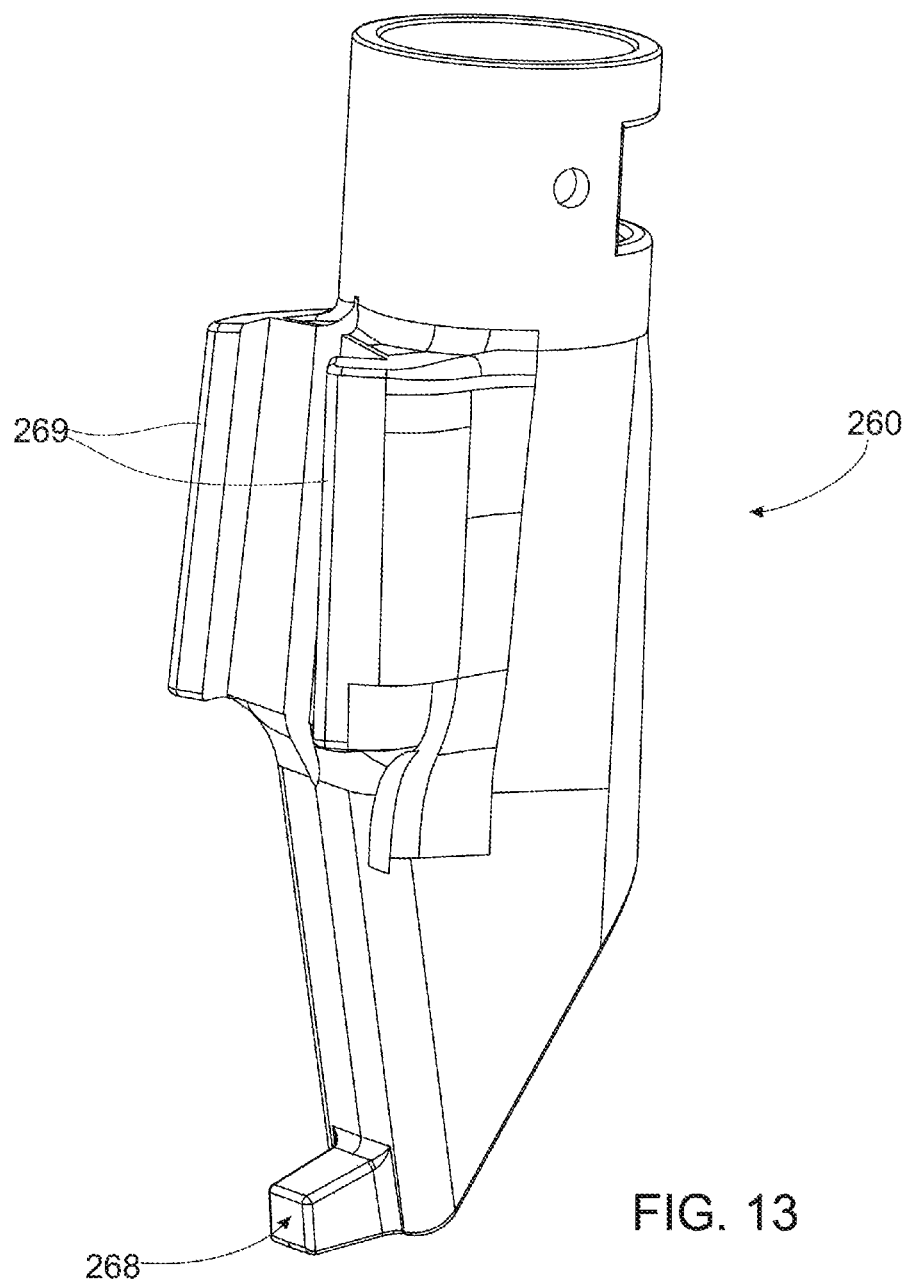
FIG. 13 is an isometric view of the seed tube of the third embodiment.

FIG. 13 illustrates the lugs 269 on the rear of the seed tube 260. The lower lug 268 assists in locating the fertiliser tube 280 relative to the seed tube 260.

Figure 14:
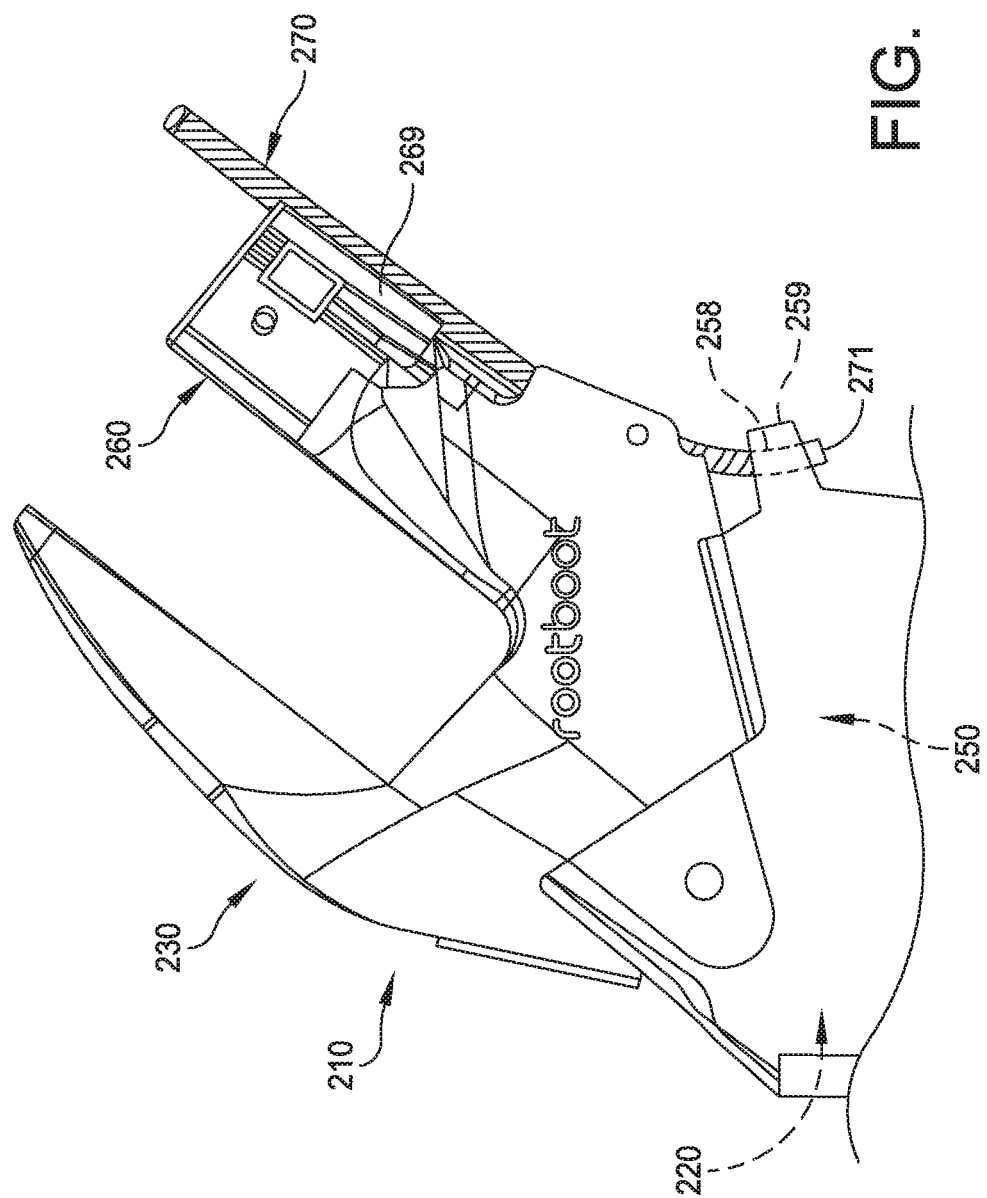
FIG. 14 is a side view of the third embodiment (with the knife point and seed distributor shown in dashed lines) where a liquid fertiliser pipe is mounted to the rear of the seed tube.
Figure 15:
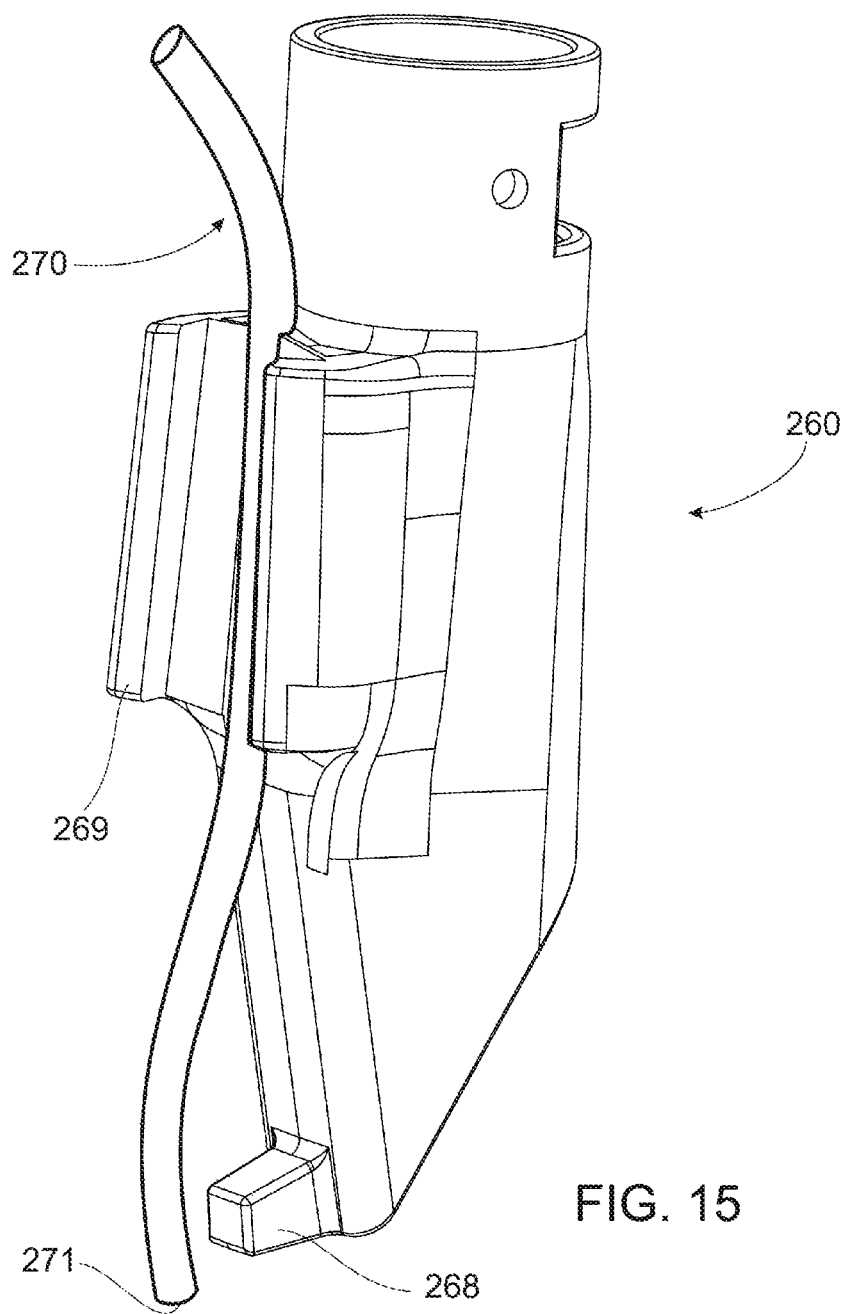
FIG. 15 is a rear isometric view showing the liquid fertiliser pipe mounted on the seed tube.
Figure 16:
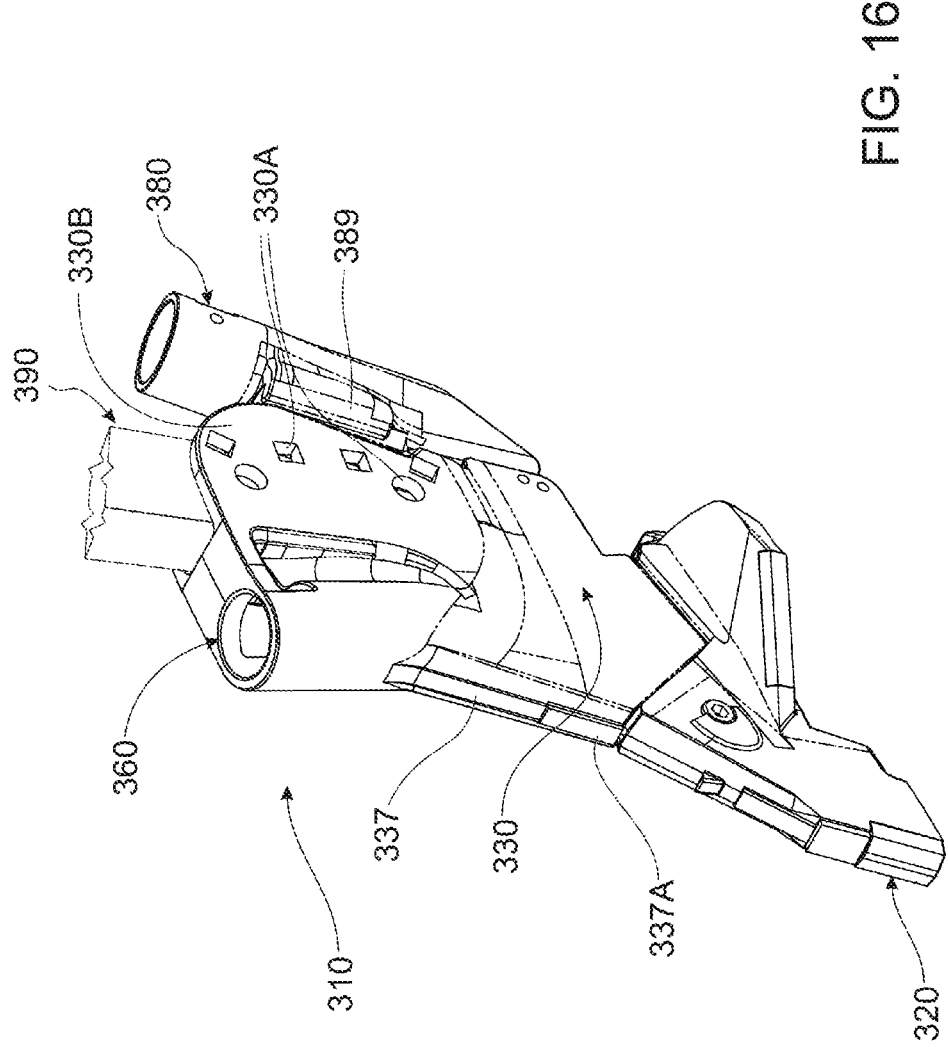
FIG. 16 is a front isometric view of a fourth embodiment of the seeding boot, in accordance with the present invention, mountable on a tyne of a tillage implement.
Figure 21:
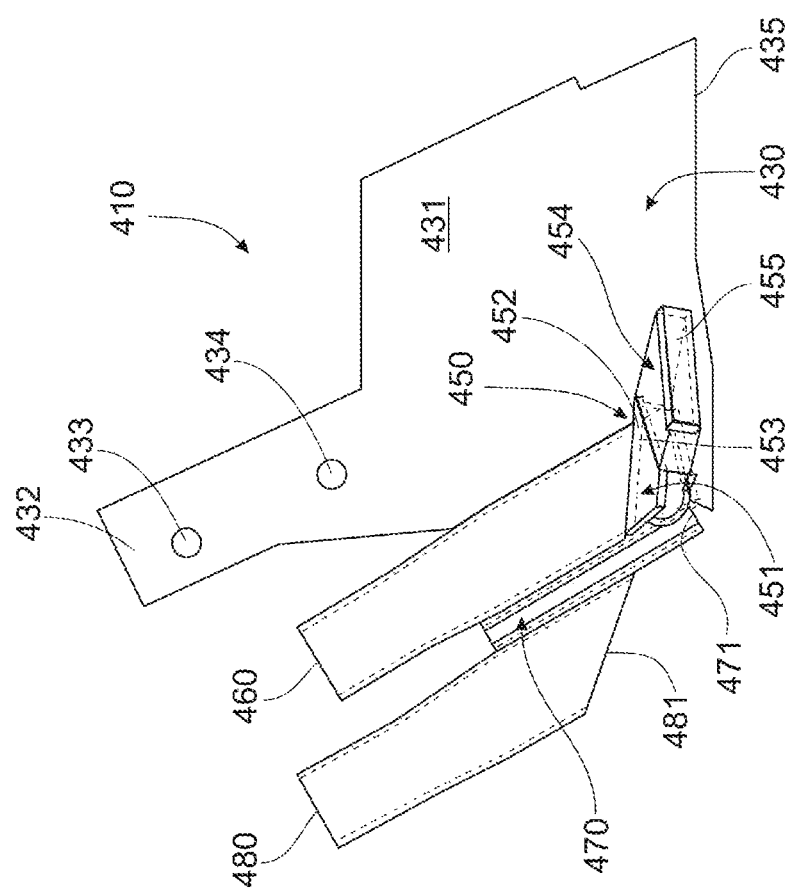
FIG. 21 is a sectional side view thereof, taken on line A-A on FIG. 20.
Figure 22:
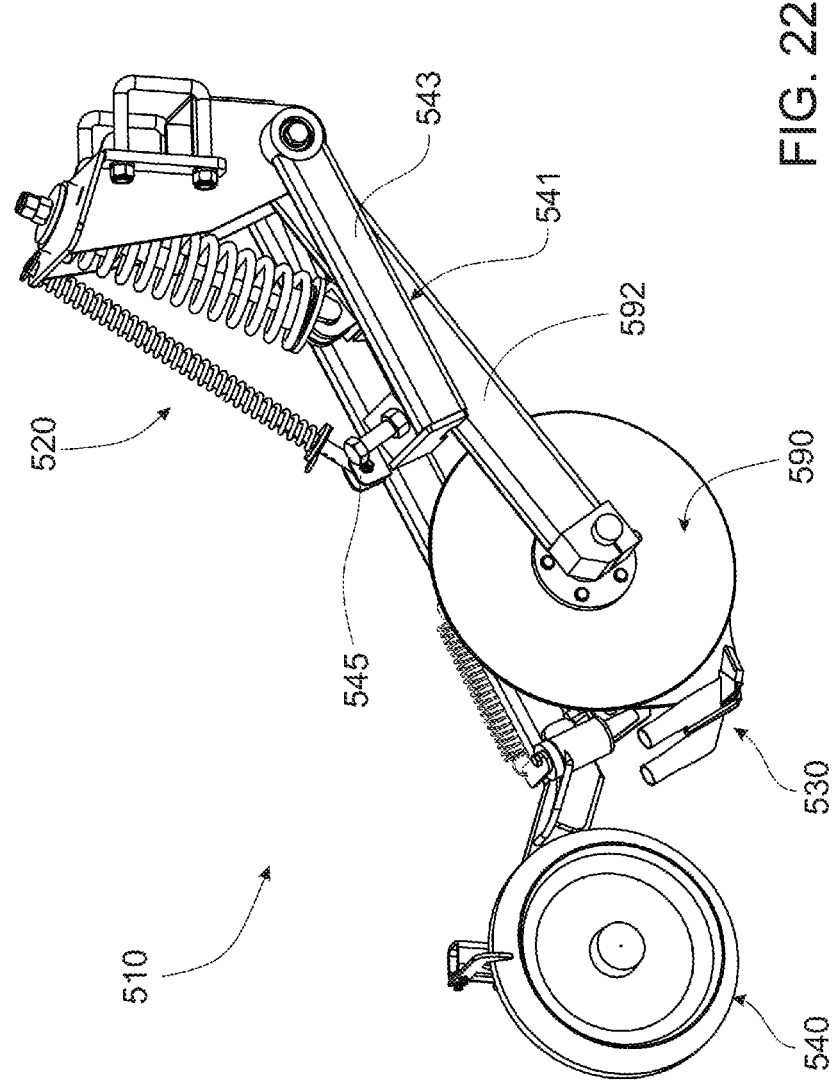
FIG. 22 is a rear isometric view, from a first side, of a disc seeder assembly of a tillage implement, provided a sixth embodiment of a seeding boot, in accordance with the present invention.
Figure 23:
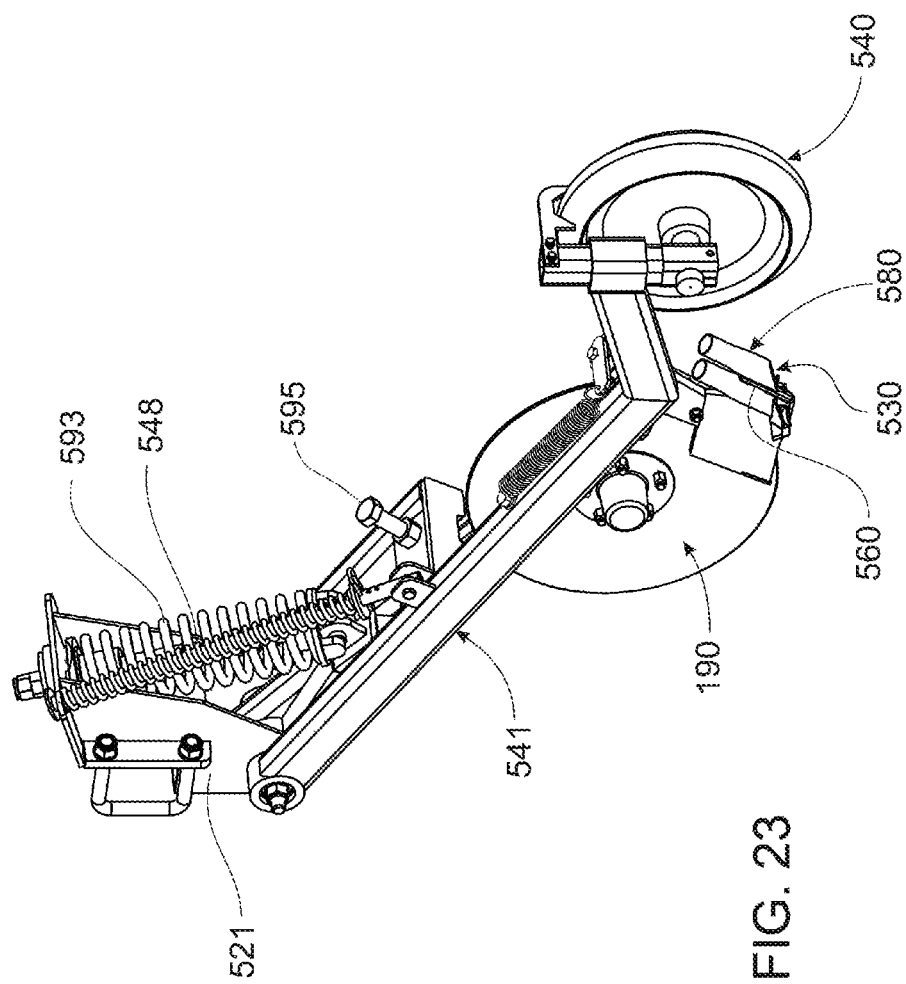
FIG. 23 is a similar view thereof, from a second side.
Figure 24:
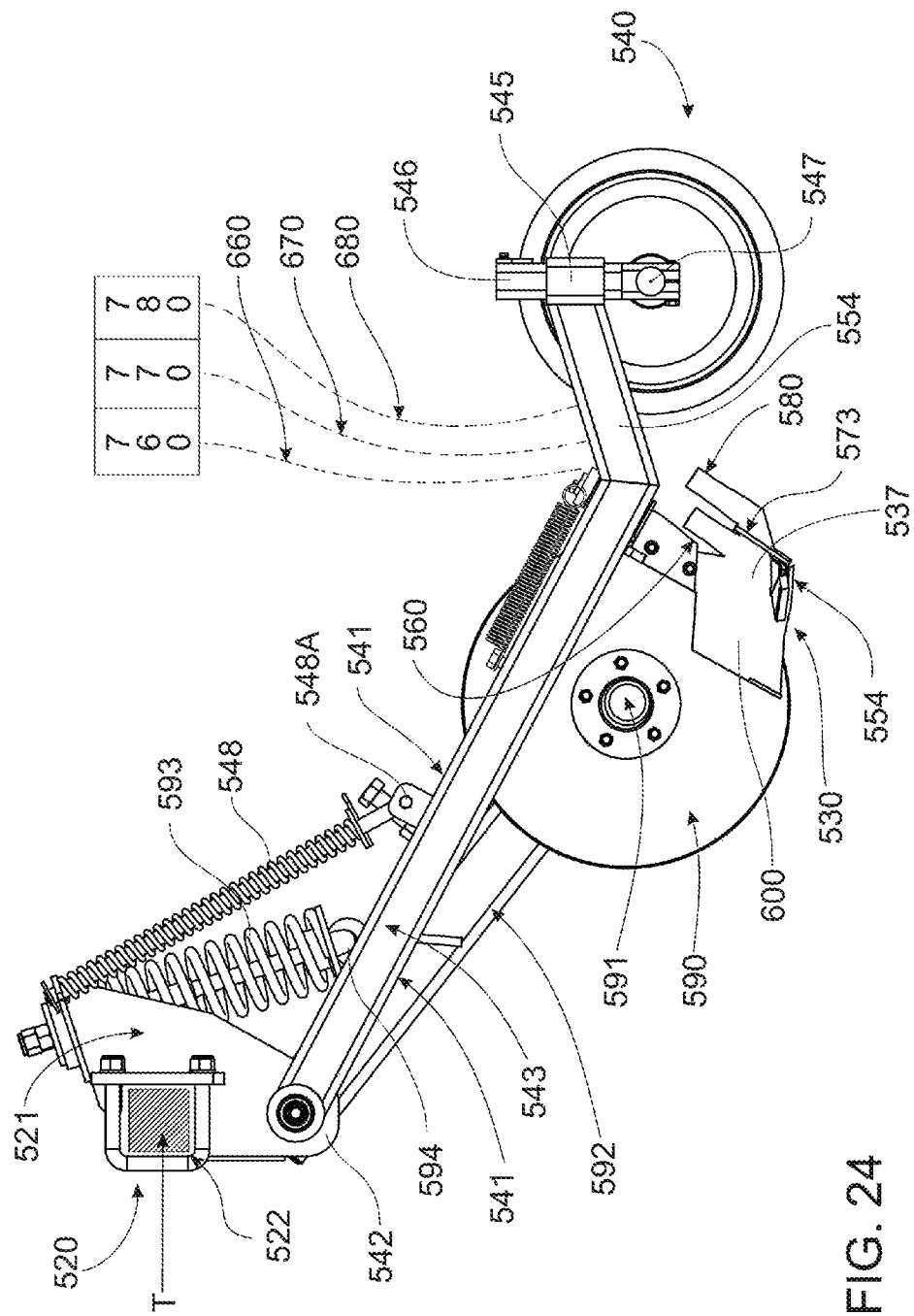
FIG. 24 is a side elevational view thereof, from the second side.
Figure 25:
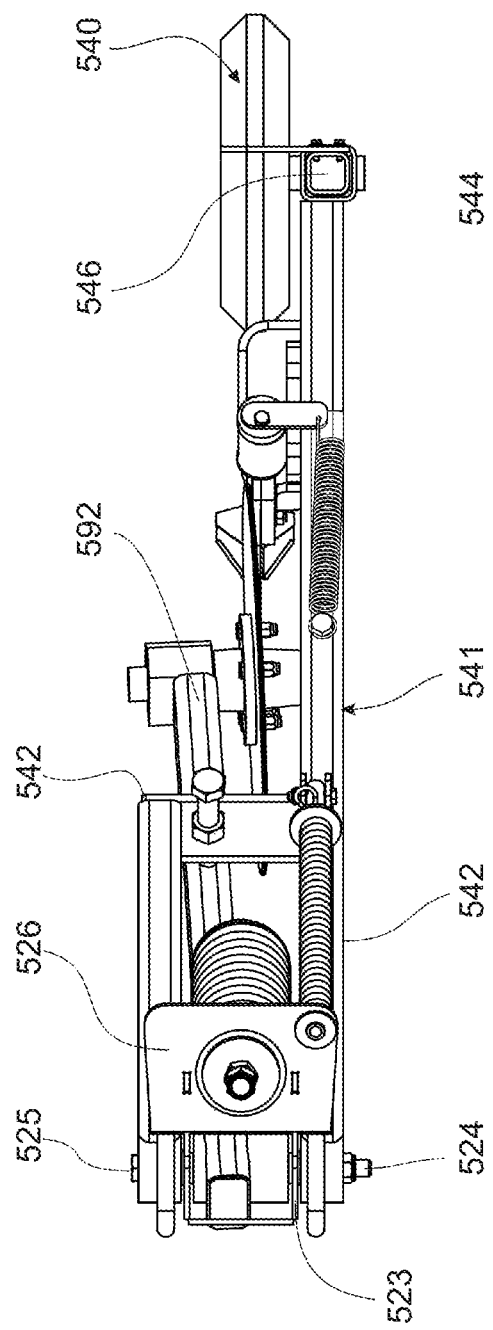
FIG. 25 is a top elevational view thereof.
Figure 27:
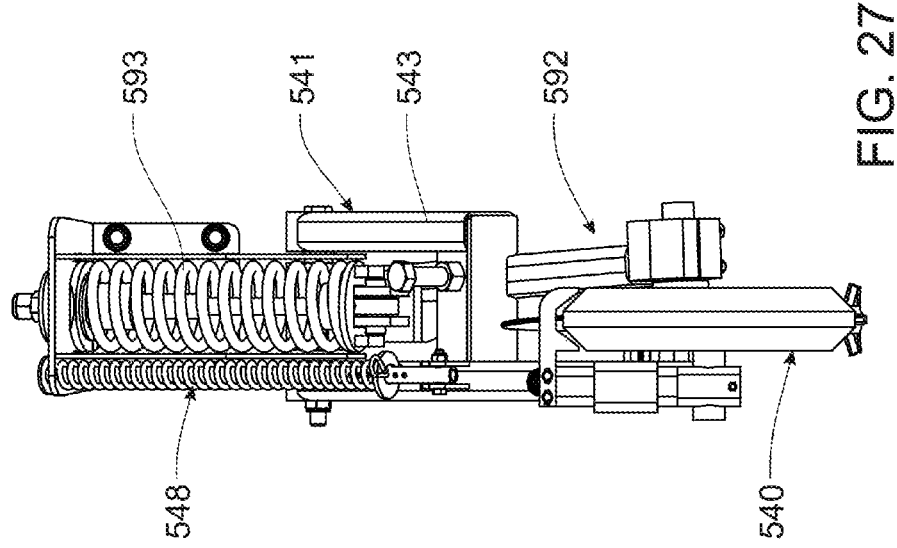
FIG. 27 is a rear elevational view thereof.
Figure 26:
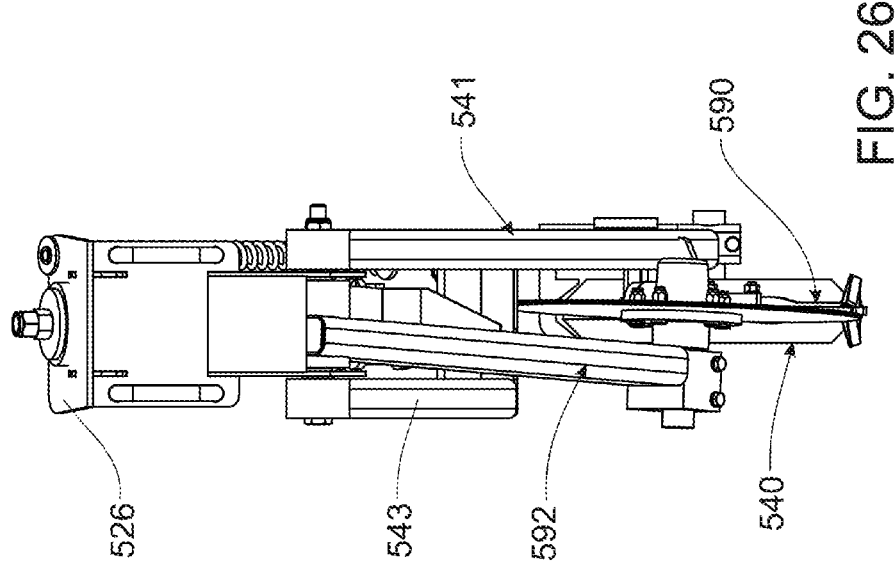
FIG. 26 is a front elevational view thereof.
Figure 28:
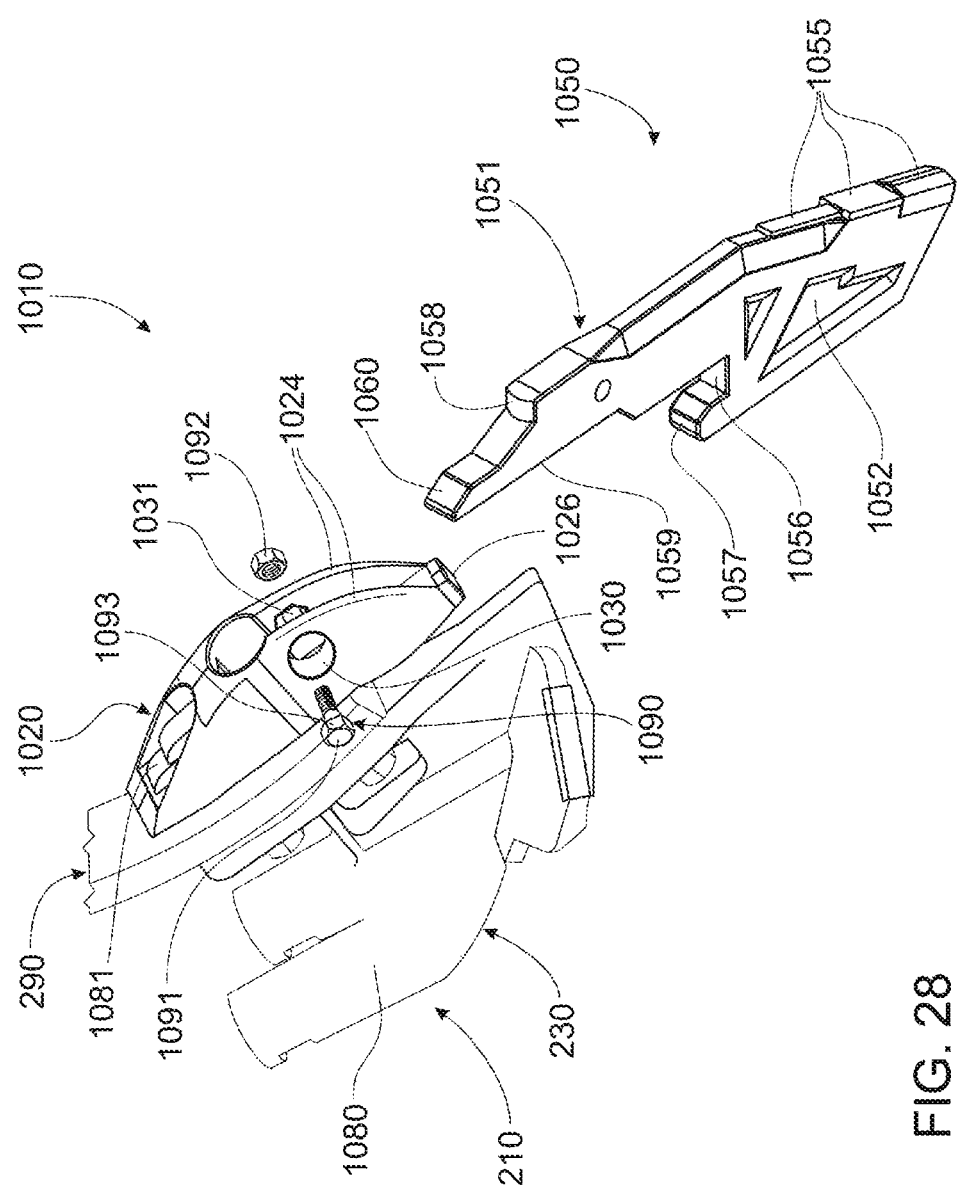
FIG. 28 is an "exploded" front isometric view of a digging assembly in accordance with the present invention.
Figure 29:
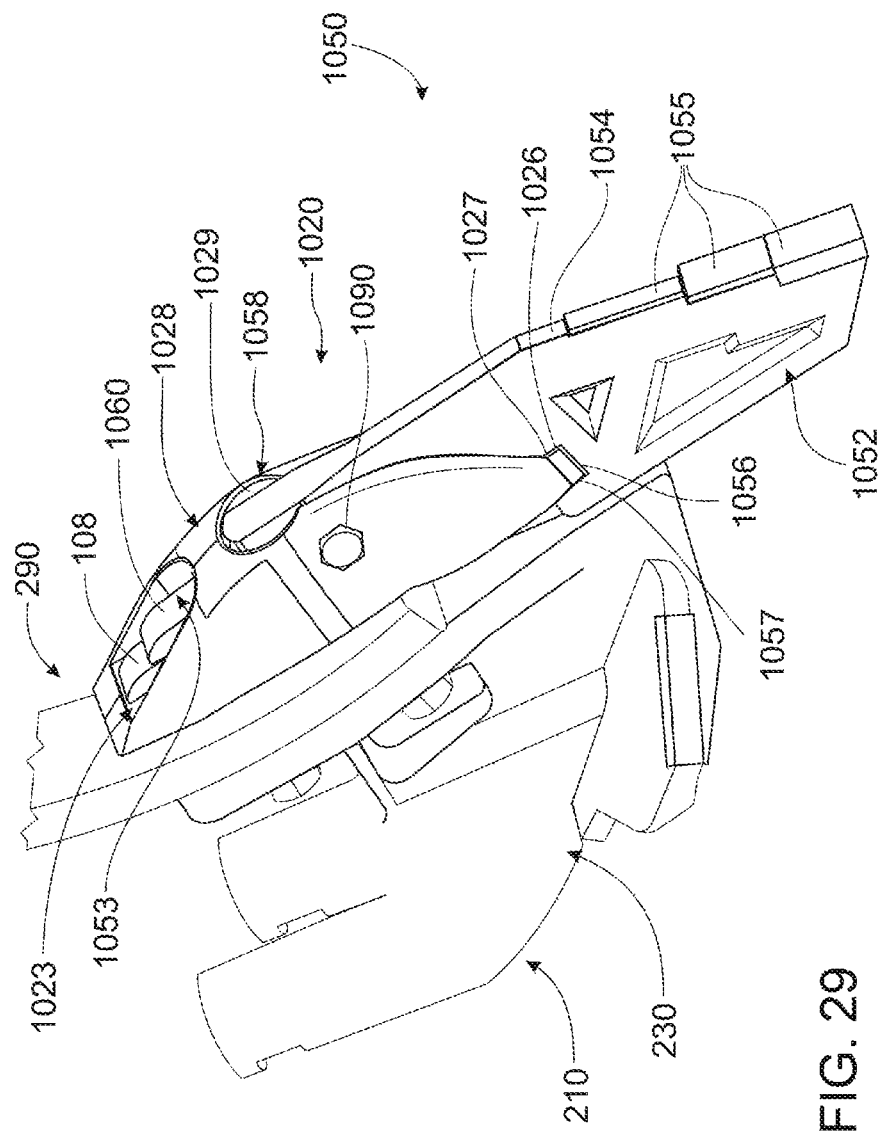
FIG. 29 is an assembled view corresponding to FIG. 28.

FIGS. 14 and 15 illustrate a liquid fertiliser pipe 270 mounted on the rear of the seed tube 260. In certain low-rainfall applications, it is preferred that only liquid fertiliser is applied to the soil. The pipe 270 is received between the lugs 269 on the seed pipe 260 and the lower end, adjacent liquid fertiliser outlet 271, is located in a hole 258 through a rear lug 259 on the seed distributor 250.

The seeding apparatus 310 of the fourth embodiment, illustrated in FIG. 162, is also cast in three sections, where the lower end of the tyne 390 is received in a socket rearwardly of the seed tube 360, the latter being provided with a nose portion 337 aligned with the removable digging point 320 and provided with at least one wear-resistant strip 337A. The seed boot 330 is releasably mounted on the tyne 390 by bolt passing through holes 330A in a pair of side plates 330B extending rearwardly of the seed tube 360. The fertiliser tube 380 is mounted to the rear of the socket by in-turned flanges 389 engaging complementary lugs on the side plates 330B.

The operating of the seed apparatus 210 and 310 is similar to the operation of the seeding apparatus 10 and 110.

The fifth embodiment of the present invention, illustrated in FIGS. 17 to 21, is arranged to be releasably mounted adjacent a lower portion of a soil-opening disc (not shown) of a disc seeder assembly of a seed tillage implement, typically a disc seeder. An example of the disc seeder assembly will be hereinafter described with reference to the sixth embodiment illustrated in FIGS. 22 to 27.

The seeding apparatus 410 is mounted on a press wheel arm of the disc seeder assembly rearwardly of a soil-opening disc (not shown); the soil-opening disc being arranged at a very small (e.g. 3°) angle to the direction of travel of the tillage implement, and/or a very small inclination (e.g. 2°-3°) to the vertical to provide an "undercut"; the soil-opening disc being arranged to cut a furrow in the soil, and to cut through any stubble or other trash lying on the soil surface.

The seeding apparatus 410 has a boot body 430, including a body plate 431 integral with, or welded or otherwise fixed to, a mounting plate 432. The mounting plate has spaced holes 433 and 434, for releasable mounting of the boot body 430 to a mounting bracket on the press wheel arm, by suitable fastener(s) (not shown). The heel 435 of the body plate 41 may be provided wear-resistant strip.

The seed distributor 450 has a hollow body 451 mounted transversely, at the rear of the body plate 431; and has a seed inlet 452 in a top wall 453, connected to a seed tube 460 (connected to the source of seed).

Hollow wings 454 extend from both sides of the seed distributor body 451, and are rearwardly inclined in top plan view. Each hollow wing 454 has a seed outlet 455 at, or adjacent, its distal end.

A liquid fertiliser tube 470 is mounted on the rear of the seed tube 460, and is connected to a source of liquid fertiliser (and/or chemical(s)); while a dry fertiliser tube 480 is mounted on the rear of the liquid fertiliser tube 470, and is connected to a source of dry, or granular, fertiliser.

The liquid fertiliser tube 470 has an outlet 471 aligned with the soil-opening disc, and at approximately the same depth as the seed outlets 455.

The dry fertiliser tube 480 also has an outlet 881 aligned with the soil-opening disc, but at a shallower depth than the liquid fertiliser outlet 471 to minimise soil "wetted" by the liquid fertiliser (and/or chemical(s)) "clogging" the dry fertiliser outlet 481. (By way of example, the dry fertiliser outlet 481 may be located at a reduced depth of 20-40 mm relative to the seed outlets 455.)

The seed outlets 455 are spaced so as to deposit the seeds in respective bands spaced e.g. 10-150 mm, more preferably 60-80 mm, from the band of fertiliser(s) deposited by the outlets 471, 481.

The operation of the seeding apparatus 410 will now be described:

As the tillage implement advances the disc seeder assembly, the soil-opening disc cuts a vertical (slot-like) furrow in the soil. The (horizontal) hollow wings 454 cut "slots" in the soil, to either side of the furrow, to form an overall "inverted-T" shape cut through the soil.

The seeds, supplied to the seed distributor body 451, via the seed tube 460, pass along the hollow wings 454 and are distributed in bands (e.g. 20-40 mm wide) from the seed outlets 455, the bands being spaced e.g. 90 mm from the centreline of the soil-opening disc.

Liquid fertiliser (and/or other chemical(s)) are dispensed from the liquid fertiliser outlet 471 into a band (e.g. of 20-40 mm width) within the furrow.

Dry (or granular) fertiliser is then dispensed from the dry fertiliser outlet 481 into a band (e.g. of 20-40 mm width) within the furrow, but at a reduced depth (of e.g. 20-40 mm) relative to the band of the liquid fertiliser.

When the soil-opening disc (and respective tubes 460, 470, 480) have passed, the soil "falls into" the furrow to close the latter, the closure being assisted by the press wheel. (As the seeds have been deposited in bands laterally offset from the furrow, they will be fully encapsulated by the soil.)

As the seeds are spaced from the fertiliser(s), they are not liable to fertiliser poisoning; and the feeder roots of the germinated seeds will progressively spread and contact the fertiliser(s) to promote the growth of their respective plants.

FIGS. 22 to 27 illustrate a disc seeder assembly, for a tillage implement, provided with a seeding apparatus of the second embodiment of the invention. The disc seeder assembly 520 is mountable on a toolbar T (or chassis) of the tillage implement (also not shown). The skilled addressee will appreciate that, in practice, a plurality of the disc seeder assemblies 520 will be mounted on the toolbar T or chassis of the tillage implement, at preferably equal spacing's.

The seeding apparatus 510 has a generally similar construction to the seeding apparatus 410 of FIGS. 17 to 21; and similar reference numeral, increased by 100, will be used for similar features (e.g. seed outlets 555).

The disc seeder assembly 520 has a pair of parallel, spaced, mounting brackets 521, each provided with D-shaped clamps 522 to secure the mounting brackets 521 to the tillage implement toolbar T. A transverse axle 523 interconnects the lower portions of the mounting plates 521, to provide respective stub-axles 524, 525. A top plate 526 interconnects the top portions of the mounting plates 521.

A press wheel 540, which also operates as a height-adjusting wheel, is provided at the trailing end of a press wheel arm 541; the leading ends 542 of a bifurcated leading portion 543 of the press wheel arm 541 being pivotally journalled (e.g. by bearings or bushes) on the stub-axles 524, 525. The press wheel arm 541 has a trailing portion 544 which is "kinked" upwardly and is terminated by a substantially-vertical socket 545, which telescopically receives a post 546 which, at its' lower end, transversely supports an axle 547 on which the press wheel 540 is rotatably journalled. By selective adjustment of the post 546 relative to the socket 545, the operating position of the press wheel arm 541 (and thereby the cutting depth of the soil-opening disc 590 and of the seed outlets 555 can be selectively set).

A compression coil spring 548 interconnects a mounting bracket 548A on a cross-bar 549, intermediate the press wheel arm 541, and the top plate 526, to maintain the press wheel 540 in contact with the soil surface (and so accurate follow the contour of the soil surface).

The soil-opening disc 590 is rotatably journalled about an axle 591 at the trailing end of a disc arm 592, the leading end of which is rotatably journalled about the axle 523 between the mounting brackets 521.

A stump-jump type compression spring 593 interconnects a mounting bracket 594, intermediate the disc arm 592, and the top plate 526, to force the soil-opening disc 590 into the soil to cut the furrow.

An adjustable stop 595 is screw-threadably mounted on the cross-bar 549 of the press wheel arm 541 and engages the disc arm 592 to adjustably set the relative position of the arms 541, 592, and thereby the cutting depth of the soil-opening disc 590.

The axle 591 is inclined, when view from above, relative to the direction of travel of the disc seeder assembly 520, so that the soil-opening disc 590 is at a small angle (e.g. 1°-5°, more preferably 3°) to the direction of travel. In addition, the axle 191 is further inclined to the vertical at a very small angle (e.g. 1°-5°, more preferably 2°-3°) to provide "undercut" by the soil-opening disc 590 to assist the penetration of the soil-opening through the soil surface, stubble and/or other trash.

The seeding apparatus 510 is mounted a mounting bracket (not shown) on the press wheel arm 541, rearwardly of the lower portion of the soil-opening disc 590 (where the lowest point on the soil-opening disc 590 extends at least a small distance below the operating depth of the underside of the boot body 530 and/or of the seed outlets 555).

The body plate 531 of the boot body 130 has a forward extension 600, which engages the shadow- (or rear-) face 596 of the soil-opening disc to act as a scraper to remove any build-up of soil/mud/trash on the soil-opening disc 590.

The tubes 560, 570, 580 are connectable to respective hoses or tubes 660, 670, 680 (shown in dashed lines in FIG. 24) connected to the respective seed, liquid fertiliser and dry fertiliser sources 760, 770, 780, as hereinbefore described.

The (curved) rear wall 5577 of the seed distributor 550 defines the lateral spacing between the seed outlets 555 (which extend along the outer portions of the rear of the wings 554 to the distal ends of the wings 554).

The operation of the seeding apparatus 510 will be similar to the operation of the seeding apparatus 410 as hereinbefore described. It will be noted that the soil-opening disc 590 cuts the seed bed to a depth below the seed outlets 555.

The skilled addressee will appreciate, that for certain seeding applications, the seeding apparatus 410, 510 may be provided with only a single seed outlet laterally offset to one side of the soil-opening disc 590.

On a modified version of the sixth embodiment of the invention, the toolbar T of the tillage implement can be rotated about its' longitudinal axis to change the relationship of the disc seeder assembly to the soil; and, in particular, the relationship of the soil-opening disc 590 to the press wheel 540. This will adjust the cutting depth of the soil-opening disc 590 and the operating depth of the seed outlets 555. This adjustment (e.g. from the prime-mover cab on the move) is in addition to the depth adjustment available by raising/lowering the toolbar T (while either on the move or stationary) and/or the adjustment between the soil-opening disc 590 and the press wheel 540 via the adjustable stop 195 (while stationary). (The holes on the mounting plates 432, 532 can also be substituted by slots to provide vertical adjustment of the boot body 430, 530 relative to the soil-opening disc 590.) The "on-the-move" depth adjustment can be advantageous when seeding an area with variable soil types (e.g. transitioning from lighter, sandy-type, soils to heavier, clay-type, soils).

The selection of material for manufacture; and the method of manufacture/assembly; can be varied to suit the particular intended application of the seeding apparatus.

Advantages of the present invention over the described prior art include (but are not limited to):

a) More streamlined shape and configuration for less drag (and thereby lower fuel consumption for the prime-mover);
b) Loosened soil adjacent to/below the seed bands promotes earlier germination of the seeds;
c) The placement of the fertiliser between, and slightly below, the seed bands, allows easy access for the roots in cold wet conditions;
d) When soil moisture is limited at later growth stages, this configuration of distributing the seeds and dispensing of the fertiliser allows the roots to access deep soil moisture, without being detrimental to plant health and growth;
e) The provision of the seed outlets to the rear of the seeding apparatus minimises blockage of the seed outlets by the surrounding soil;
f) The boot enables the provision of larger seed outlets, making the seeding apparatus suitable for a wider range of seeds;
g) Positioning the fertiliser outlet(s) behind seed outlets minimises the likelihood of the fertiliser leaching into the seed bands;
h) Overtop encapsulation of the seed bands by the soil is ensured;
i) Larger wear-resistant coatings/panels/tiles (e.g. of tungsten), and the mounting of the seeding apparatus on the rear of the tyne, minimise wear (and extend the working-life) of the seeding apparatus;
j) The seeding apparatus can be easily removed/refitted when changing the knife point or other tillage point/blade/share; and
k) The seeding apparatus can be fitted to existing tynes without requiring modification of the latter.

FIGS. 28 to 31 illustrate a digging assembly 1010 which is particularly suitable for, but not limited for use with, the seeding apparatus hereinbefore described.

The digging assembly 1010 is mounted at the lower end of tyne 290, on which is mounted a seeding apparatus 210, with a seeding boot 230, as hereinbefore described.

Figure 30:
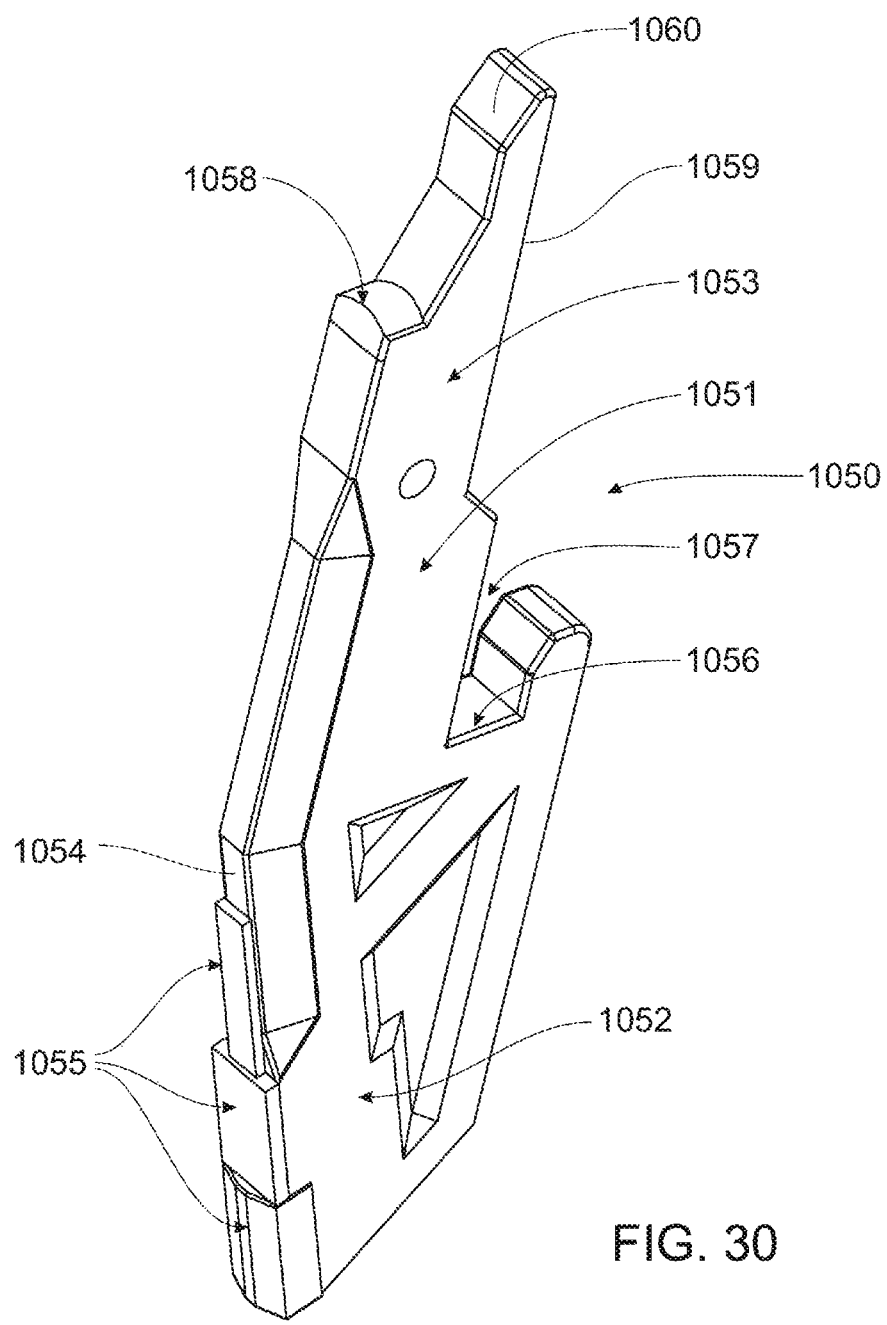
FIG. 30 is a front isometric view of the knife point for the digging assembly.
Figure 31:
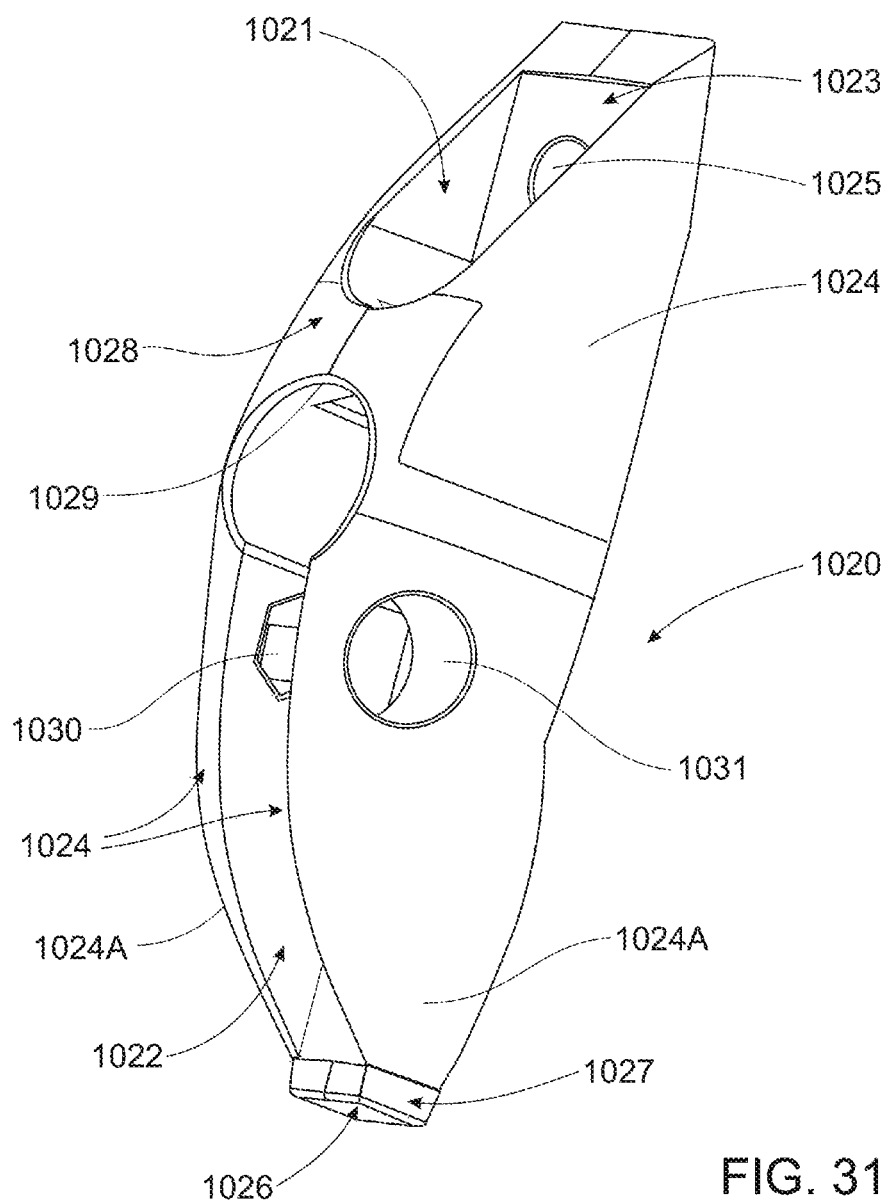
FIG. 31 is a front isometric view of a holder for the digging assembly.

The digging assembly 1010 has a knife point holder 1020 and a knife point 1050, illustrated on a larger scale in FIGS. 31 & 30 respectively.

The holder 1020 has a holder body 1021 with an elongate socket 1022 defined by a base wall 1023, which interconnects a pair of side walls 1024. A pair of bolt holes 1025 through the base wall 1023 enables the latter to be secured to the lower end of the tyne 290 by bolts having nuts 1080.

A first abutment face 1026 is provided on the lug 1027 extending forwardly of the base wall 1023.

The side walls 1024 have tapered "cheeks" 1024A at the forward ends to promote "smooth" soil flow over the holder 1020, with minimal outward "throw" of the soil.

A top wall 1028 interconnects the side walls intermediate their lengths, and overlies the elongate socket 1022. The top wall 1028 has forwardly-directed second abutment face 1029, which is concave on top plan view, and which enables access to the forward-most bolt securing the base wall 1023 to the tyne 290. The rear portion of the top wall 1028 enables access to the socket 1022, and thereby the rearward-most bolt securing the base wall 1023 to the tyne 290.

Aligned holes 1030, 1031 are provided in the side walls 1024 to receive the head 1091, and the nut 1092 applied to shank 1093, of the bolt 1090, which releasably secures the knife point 1050 to the holder 1020.

The knife point 1050 has an elongate body 1051 with front and rear portions 1052, 1053.

The front portion 1052 of the body 1051 has an inclined soil-cutting face 1054, provided with a plurality of wear-resistant strips 1055.

A rearwardly-directed first abutment face 1056 is provided in a recess 1057 in the front portion 1052 of the body 1051, the recess 1057 receiving the lug 1027 extending forwardly from the holder 1020.

A rearwardly-directed second abutment face 1058, convex in top plan view, is provided on the top of the front portion 1052 and is complementary to the second abutment face 1029 on the top wall 1028 of the holder 1020.

The rear portion 1053 of the body 1051 has a lower face 1059 which can bear on the heads of the bolts securing the holder 1020 to the tyne 290; where bolt retainers 1081 are placed in the socket 1023, about the bolt heads, to prevent the bolts from rotating during use, but enable access by sockets to enable the nuts 1080 to be removed when the holder 1020 is to be removed from the tyne 290.

A face 1060 at the rear end of the rear portion 1053 can be engaged with a drift, or other tool, to release the knife point 1050 from the holder 1020, should this be necessary.

The skilled addressee will appreciate that the digging assembly 1010 is suitable for mounting on the tynes of a wide range of tillage implements; and need not be associated with the seeding apparatus hereinbefore described.

The digging assembly 1010 enables easy, quick, replacement of the knife points 1050 on the tynes when the former become worn or damaged, or alternative knife points are required.

The skilled addressee will appreciate that various changes and modifications may be made to the embodiments, as described and illustrated, without departing from the present invention. For example, the seeding apparatus may be provided with only a single seed outlet laterally offset to one side of the tyne or seed-opening disc.

The invention claimed is:

1. A seeding boot for a seeding apparatus mountable adjacent a soil-opening disc of a tillage implement, the seeding boot including:
    a boot body mounted at, or adjacent, a lower portion of the soil-opening disc;
    a seed distributor on the boot body, the seed distributor having at least two seed outlets spaced laterally from the soil-opening disc;
    a seed inlet, connectable to a source of seeds to be planted, for the seed distributor; and
    at least one fertiliser distributor, the at least one fertiliser distributor having at least one fertiliser outlet located rearwardly of the soil-opening disc, and downstream of the at least two seed outlets; wherein:
    the seed distributor has a substantially hollow distributor body connected to the seed inlet; and
    a pair of substantially hollow wings extend substantially laterally from the distributor body and are each provided with a respective one of the at least two seed outlets.

2. The seeding boot of claim 1, wherein:
    the boot body is releasably mounted to a press wheel arm of the tillage implement.

3. The seeding boot of claim 1, wherein:
    each wing is rearwardly inclined, in top plan view, so that the seed outlets are rearward of the distributor body.

4. The seeding boot of claim 1, wherein:
    the seed inlet is operably connected to the source of seeds by a seed tube mounted rearwardly of the soil-opening disc.

5. The seeding boot of claim 1, wherein:
    the at least one fertiliser outlet includes a first fertiliser outlet and a second fertiliser outlet; and
    the first fertiliser outlet is connected to a source of dry or granular fertiliser by a dry fertiliser tube; and
    the second fertiliser outlet is connected to a source of liquid fertiliser or other chemicals.

6. The seeding boot of claim 5, wherein:
    at least one of the first and second fertiliser outlets are aligned rearwardly of the soil-opening disc;
    the second fertiliser outlet is intermediate the soil-opening disc and the at least one fertiliser outlet; and
    at least one of the first and second fertiliser outlets are at a reduced depth in the soil relative to the at least one seed outlet.

7. The seeding boot of claim 1, wherein:
    at least leading portions of the boot are provided with one or more wear-resistant coatings, panels, or tiles.

8. A disc seeder assembly for a tillage implement provided with a seeding boot as claimed in claim 1.

9. A tillage implement provided with at least one disc seeder assembly provided with a seeding boot as claimed in claim 1.

10. A method of seeding seeds and fertiliser employing a tillage implement having at least one disc seeder assembly provided with a seeding boot as claimed in claim 1.

11. The seeding boot of claim 2, wherein the boot body incorporates a plate engageable with a rearward-face of the soil-opening disc.

* * * * *